United States Patent
Miyamoto et al.

(10) Patent No.: US 7,360,855 B2
(45) Date of Patent: Apr. 22, 2008

(54) IMAGE PROCESSING DEVICE, IMAGE PROCESSING METHOD, AND PROGRAM

(75) Inventors: Toru Miyamoto, Hachioji (JP); Osamu Shinkawa, Chino (JP); Hitoshi Yamakado, Hino (JP); Yu Gu, Fuchu (JP); Toru Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 276 days.

(21) Appl. No.: 11/284,355

(22) Filed: Nov. 21, 2005

(65) Prior Publication Data

US 2006/0132875 A1    Jun. 22, 2006

(30) Foreign Application Priority Data

Dec. 16, 2004  (JP) ............................. 2004-364109
Feb. 22, 2005  (JP) ............................. 2005-045136
Aug. 25, 2005  (JP) ............................. 2005-244676

(51) Int. Cl.
   *B41J 2/205* (2006.01)
(52) U.S. Cl. .......................................... 347/15; 347/43
(58) Field of Classification Search .................. 347/15, 347/43
   See application file for complete search history.

(56) References Cited

U.S. PATENT DOCUMENTS 6,147,771 A * 11/2000 Washio ........................ 358/1.9
6,328,404 B1 * 12/2001 Fujimori ...................... 347/15

FOREIGN PATENT DOCUMENTS

| JP | 07-052390 | 2/1995 |
| JP | 07-052391 | 2/1995 |
| JP | 07-060969 | 3/1995 |
| JP | 07-125311 | 5/1995 |
| JP | 11-058732 | 3/1999 |
| JP | 2001-018374 | 1/2001 |
| JP | 2001-150701 | 6/2001 |

* cited by examiner

*Primary Examiner*—Thinh Nguyen
(74) *Attorney, Agent, or Firm*—Harness, Dickey & Pierce, P.L.C.

(57) ABSTRACT

The invention provides an image processing device, comprising: an N-level quantization unit, where N is a natural number equal to or greater than 2, the unit converting multi-level image data into N-level image data, the multi-level image data including a plurality of pixels, each pixel having a value corresponding to one of a multi-level gradation, and the N-level image data including a size of an ideal ink dot to be formed; a memory that stores error information, the error information corresponding to a difference between an ideal ink dot and an actual ink dot, the actual ink dot being formed by an image forming device, the image forming device having a plurality of nozzles, and each of the plurality of nozzles being associated with an ideal ink dot and an actual ink dot, and being capable of ejecting M-number of ink dot sizes, where M is a natural number equal to or greater than 2 and satisfies M≧N); an error information obtaining unit that obtains from the memory error information corresponding to an identified one of the plurality of nozzles, the identified nozzle being used for image processing; a dot size determining unit that determines a size of an ink dot on the basis of the error information, the ink dot being ejected by the identified nozzle, and a size of the ink dot being determined such that a density of the ejected ink dot is approximately equal to a required density, the required density being determined by the N-level image data; and an output unit that outputs to the image forming device an instruction for causing ejection of an ink dot from the identified nozzle, the size of the ejected ink dot being determined by the dot size determining unit.

11 Claims, 26 Drawing Sheets

FIG. 10

|   | 0 | 1 | 2 | 3 | 4 |
|---|---|---|---|---|---|
| 0 | 0 | 1 | 1 | 0 | 1 |
| 1 | 1 | 0 | 1 | 0 | 1 |
| 2 | 0 | 0 | 0 | 1 | 0 |
| 3 | 1 | 0 | 1 | 0 | 1 |

FIG. 11

|   | 0 | 1 | 2 | 3 | 4 |
|---|---|---|---|---|---|
| 0 | 0 | S | M | 0 | L |
| 1 | S | 0 | M | 0 | L |
| 2 | 0 | 0 | 0 | L | 0 |
| 3 | S | 0 | M | 0 | L |

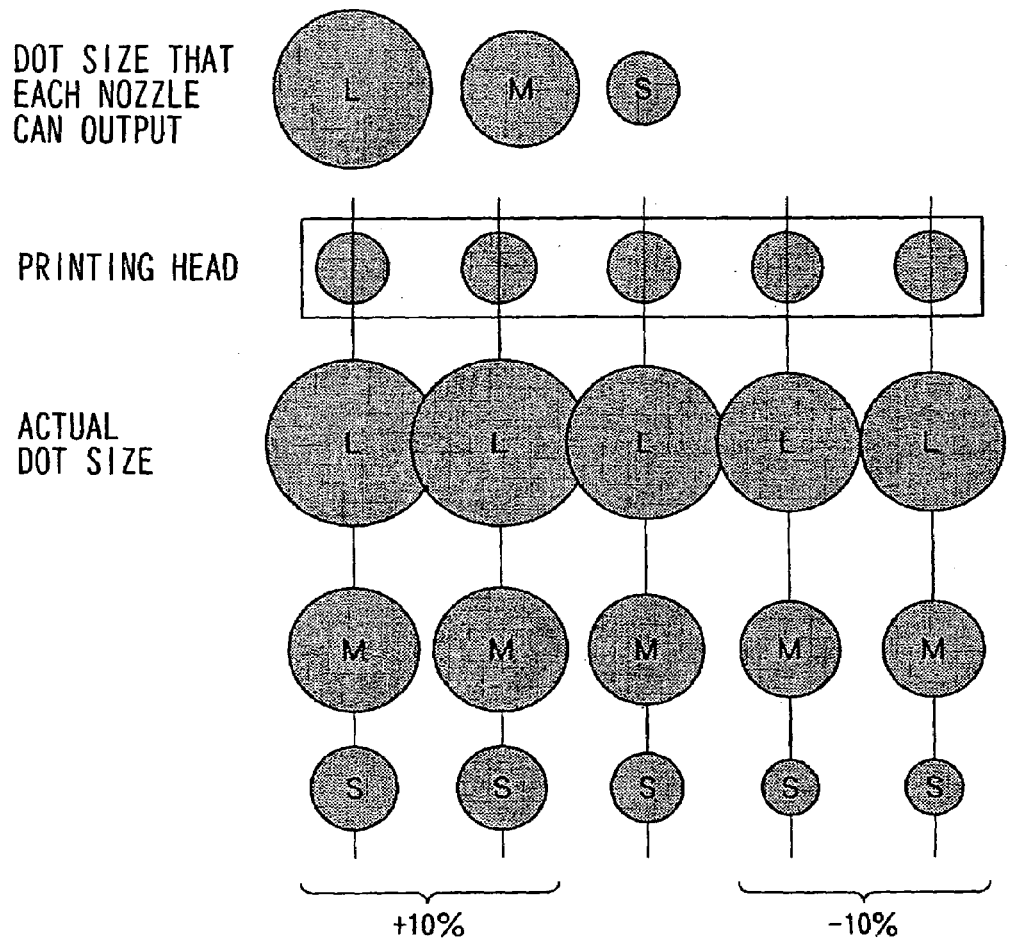

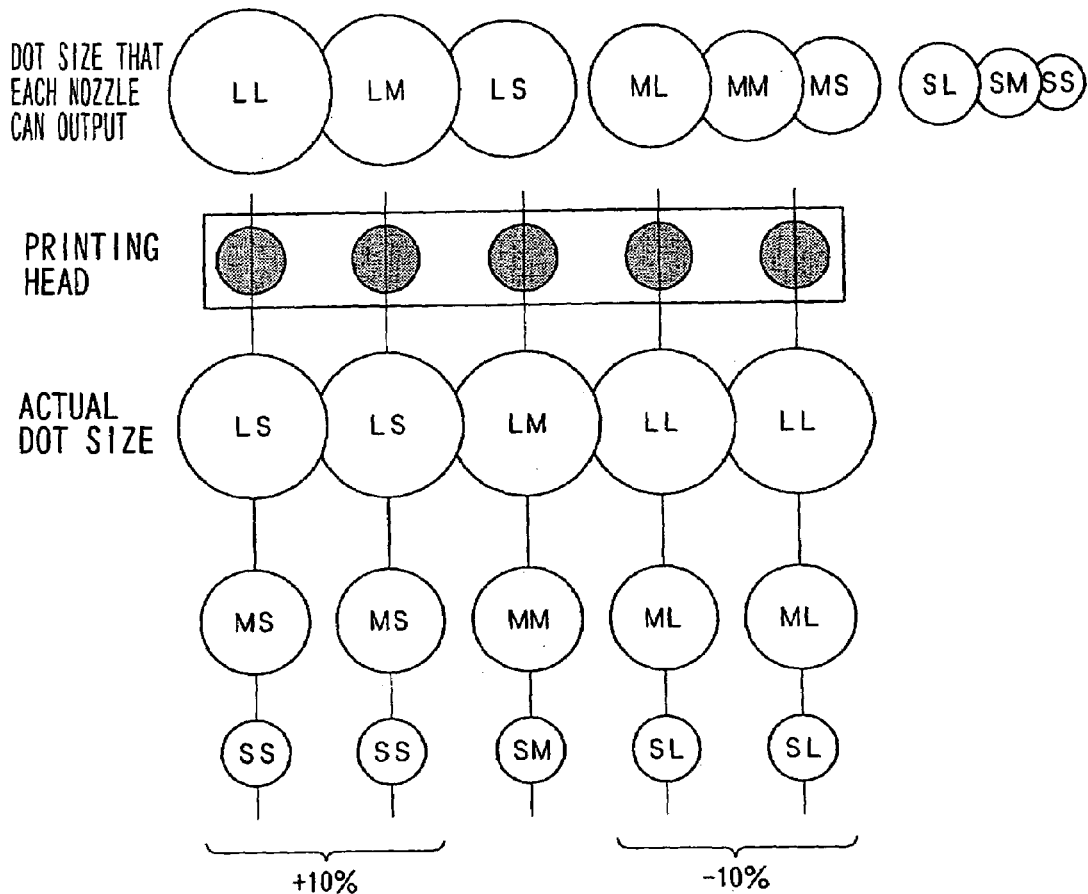

FIG. 22

| I | K | J = 0 | J = 1 |
|---|---|---|---|
| 0 | 1 | Size1 | |
| 1 | 1 | Size2 | |
| 2 | 1 | Size3 | |
| 3 | 1 | Size4 | |
| 4 | 1 | Size5 | |
| 5 | 1 | Size6 | |
| 6 | 1 | Size7 | |
| 7 | 2 | Size4 | Size5 |
| 8 | 2 | Size5 | Size6 |
| 9 | 2 | Size6 | Size7 |

FIG. 23

| NOZZLE IDENTIFIER, NID (X COORDINATE OF TARGET PIXEL) | 0 | 1 | 2 | 3 | 4 |
|---|---|---|---|---|---|
| S (=40%) | I = 1 | I = 1 | I = 1 | I = 1 | I = 1 |
| M (=80%) | I = 7 | I = 7 | I = 3 | I = 3 | I = 3 |
| L (=120%) | I = 9 | I = 9 | I = 5 | I = 8 | I = 8 |

FIG. 24

NOZZLE IDENTIFIER, NID
(X COORDINATE OF TARGET PIXEL)

|  | 0 | 1 | 2 | 3 | 4 |
|---|---|---|---|---|---|
| S (=40%) | J=0 | J=0 | J=0 | J=0 | J=0 |
| M (=80%) | J=1 | J=0 | J=0 | J=0 | J=0 |
| L (=120%) | J=0 | J=0 | J=0 | J=0 | J=1 |

FIG. 26

|  | 0 | 1 | 2 | 3 | 4 |
|---|---|---|---|---|---|
| 0 | 0 | S | L | 0 | M |
| 1 | L | 0 | M | 0 | M |
| 2 | L | 0 | 0 | S | 0 |
| 3 | M | 0 | S | 0 | L |

FIG. 27

|  | 0 | 1 | 2 | 3 | 4 |
|---|---|---|---|---|---|
| 0 | 0 | Size2 | Size6 | 0 | Size4 |
| 1 | Size7 | 0 | Size4 | 0 | Size4 |
| 2 | Size6 | 0 | 0 | Size2 | 0 |
| 3 | Size4 | 0 | Size2 | 0 | Size5 |

INTER-DOT DENSITY

FIG. 36

|     | NN   | LR   | RL   | LN   | NR   | RN   | NL   |
|-----|------|------|------|------|------|------|------|
| M-L | 90.1 | 74.4 | 96.8 | 84.1 | 84.1 | 94.2 | 94.2 |
| M-M | 80   | 60   | 91.2 | 70   | 70   | 86.7 | 86.7 |
| M-S | 71.9 | 52.9 | 85.3 | 61.9 | 62.9 | 80.7 | 79.7 |
| L-L | 96.8 | 88   | 99.8 | 93.4 | 93.4 | 98.8 | 98.8 |
| L-M | 90.1 | 74.4 | 96.8 | 84.1 | 84.1 | 94.2 | 94.2 |
| L-S | 84.5 | 67.4 | 92.3 | 76.3 | 77.4 | 89.7 | 88.6 |
| S-L | 84.5 | 67.4 | 92.3 | 77.4 | 76.3 | 88.6 | 89.7 |
| S-M | 71.9 | 52.9 | 85.3 | 62.9 | 61.9 | 79.7 | 80.7 |
| S-S | 63.8 | 45.9 | 78.8 | 54.8 | 54.8 | 72.7 | 72.7 |

FIG. 37

|   | NN | LR | RL | LN | NR | RN | NL |
|---|----|----|----|----|----|----|----|
| M | M  | L  | S  | L  | L  | S  | S  |
| L | S  | M  | S  | S  | S  | S  | S  |
| S | L  | L  | S  | L  | L  | M  | M  |

| NOZZLE IDENTIFIER, NID (X COORDINATE OF TARGET PIXEL) | 0 | 1 | 2 | 3 | 4 |
|---|---|---|---|---|---|
| DOT SIZE (INSTRUCTION FOR EJECTING AN INK DOT) | L | M | S | L | S |

→ x

|   | 0 | 1 | 2 | 3 | 4 |
|---|---|---|---|---|---|
| 0 | 0 | 1 | 1 | 0 | 1 |
| 1 | 1 | 0 | 1 | 0 | 1 |
| 2 | 0 | 0 | 0 | 1 | 0 |
| 3 | 1 | 0 | 1 | 0 | 1 |

↓ y

DOT SIZE THAT EACH NOZZLE CAN OUTPUT: LL, LM, LS, ML, MM, MS, SL, SM, SS

|   | 0 | 1 | 2 | 3 | 4 |
|---|---|---|---|---|---|
| 0 | O | M | S | O | S |
| 1 | L | O | S | O | S |
| 2 | O | O | O | L | O |
| 3 | L | O | S | O | S |

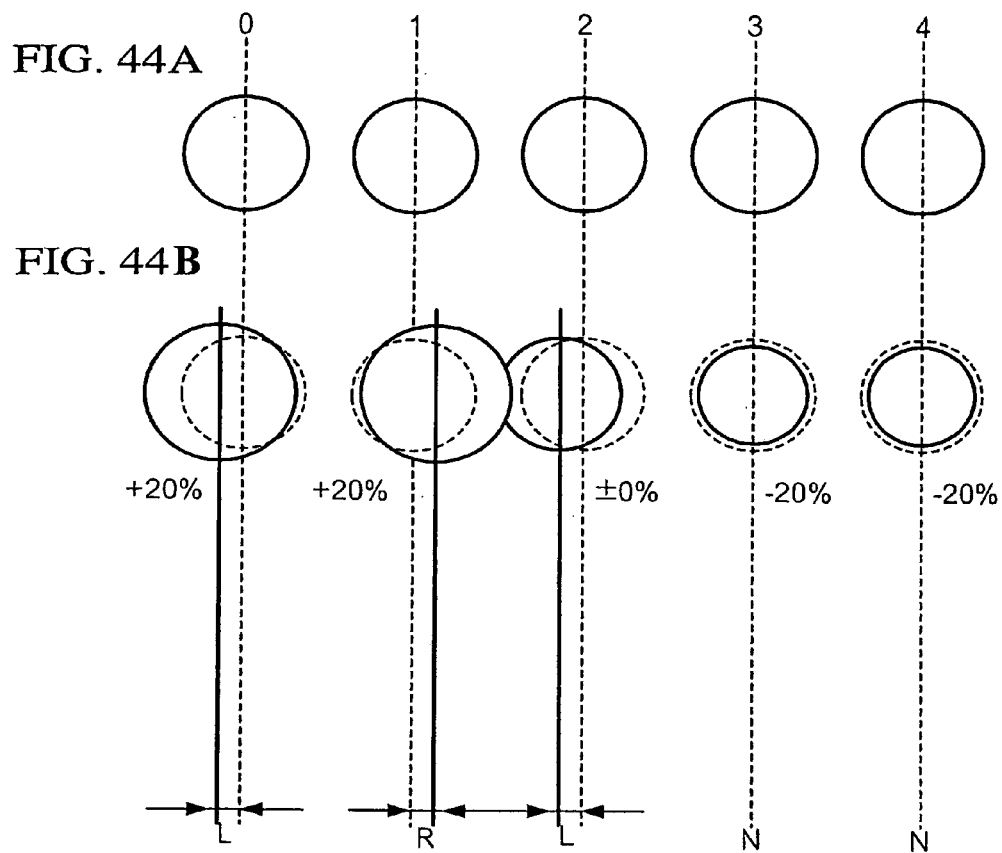

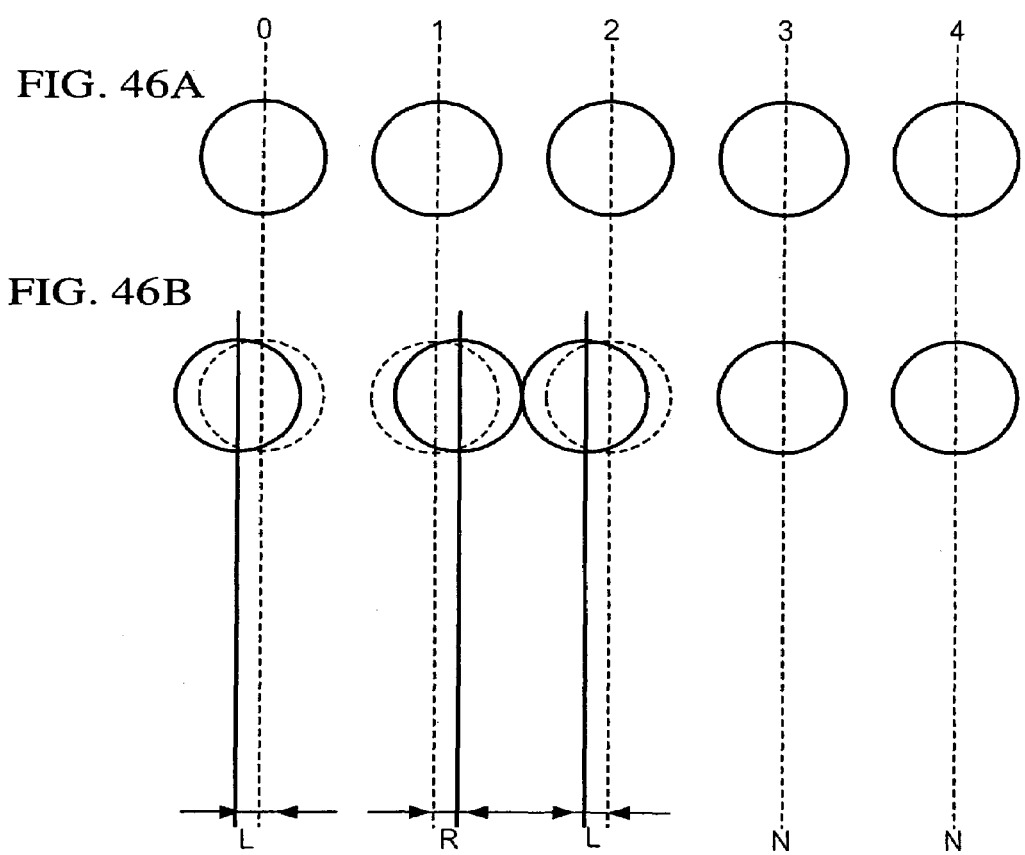

IMAGE PROCESSING DEVICE, IMAGE PROCESSING METHOD, AND PROGRAM

The entire disclosures of Japanese Patent Application No. 2004-364109, filed Dec. 16, 2004, Japanese Patent Application No. 2005-045136, filed Feb. 22, 2005, and Japanese Patent Application No. 2005-244676, filed Aug. 25, 2005 are expressly incorporated by reference herein.

BACKGROUND

1. Technical Field

The present invention relates to an image processing device. Specifically, the present invention relates to an ink jet printer for outputting color ink in particulate form (ink dots) onto a print media to thereby form desired characters and images.

2. Related Art

In line with widespread consumer use of personal computers, digital cameras, and so on, ink jet printers are also now widely used by consumers, as well as in offices. The popularity of such printers is due to their ability to provide high quality color printing at a low cost.

Generally, ink jet printers have a carriage in which ink cartridges with integral printing heads are provided. In operation, the carriage of the printer is caused to scan in a direction orthogonal to that in which a sheet for printing is fed through the printer (chassis), and ink is ejected in particulate form from the printing heads onto a print media to thereby form thereon desired characters and images. Ink jet printers are capable of forming color images as well as monochrome images by use of a carriage having color ink cartridges (for example, black (K), yellow (Y), magenta (M), and cyan (C)), the cartridges being provided with an integral printing head. To obtain higher quality color images, recently some ink jet printers have been developed having six, seven, or eight color ink cartridges (for example, light-cyan and light-magenta as well as YMCK).

An ink jet printer that carries out printing by scanning of its cartridge carriage in a direction orthogonal to a print media feeding direction is referred to as a "multi-pass printer". In using such a printer, to obtain an image that covers an entire surface of a print media, it is necessary for the carriage of the printer to scan orthogonal to the media tens of to more than a hundred times. Consequently, such printers suffer from a disadvantage in that they take a long time to print an image as compared to, for example, laser printers using electrophotography.

To attain high speed printing, there has been developed an ink jet printer having a long printing head and no carriage. This type of ink jet printer is referred to as a "line head printer". In using a line head printer, there is no necessity to move a printing head in a direction orthogonal to that of feeding of print media. A line head, printer carries out so-called "single-pass printing"; and is able to produce prints at a rate that is as fast as that of a laser printer.

The printing head of a single-pass printer is provided with micro nozzles having a diameter of 10-70 micrometers. The nozzles are provided in the printing head at regular intervals; and their layout may be such as is capable of printing a plurality of lines. It is preferable that the sizes of ink particles ejected from each nozzle remain constant for all nozzles. However, in practice, a size of ink particles ejected from each nozzle may be subject to slight deviations. Such deviations cause inconsistencies in a density of ink printed on a print medium.

In addition, in a case that an output direction of a nozzle of such a printing head deviates from its ideal direction because of a fabrication error, or in a case that a position of the nozzle deviates from its ideal position because of a fabrication error, an ink dot formed on a paper by the nozzle will also deviate from its ideal position. This phenomenon is referred to as "splash bending", and causes print errors. Splash bending causes a deterioration in print quality. Specifically, intervals between adjacent ink dots become non-uniform by splash bending. Thus, at a part of a printed image in which two ink dots are printed at an interval that is longer than the ideal interval, a light band is likely to appear; and at a part of printed image in which two ink dots are printed at an interval that is shorter than the ideal interval, a dark band is likely to appear. This phenomenon is referred to as "banding".

For example, JP-A-11-058732 discloses a method of compensating for a deviation in a size of an ink dot. In JP-A-11-058732, each nozzle has its own gain control circuit. The gain control circuit controls a gain of each nozzle so that the size of ink dots formed by the nozzles is constant and equal to the required density.

To prevent banding, two approaches are available. One approach is to improve hardware such as a printing head or a carriage. The other approach is to improve software for processing image data. For example, Japanese Patents No. 3176182, 3176183, 3176184, and 3478573, JP-A-2001-018374, and JP-A-2001-150701 disclose software approaches to prevent banding. According to Japanese Patents No. 3176182, 3176183, 3176184, and 3478573, the printing head is repeatedly moved over a predetermined area. Thus, the characteristics of the nozzles are inconspicuous because a plurality of nozzles eject ink dots onto approximately the same point on a print media. JP-A-2001-018374 and JP-A-2001-150701 disclose ink jet printers having a plurality of printing heads. The ink jet printers print an image at a predetermined area by using the plurality of printing heads, each of which has different output characteristics, which prevents deviations in characteristics from becoming conspicuous in printing.

According to a method disclosed in JP-A-11-058732, it is necessary for each nozzle to have a dedicated gain control circuit. This results in a disadvantage in that the printer of JP-A-11-058732 is expensive to fabricate and complex. Furthermore, JP-A-11-058732 is subject to another problem in that the printer has to control all of the gain control circuits, and therefore has a high control-load.

Furthermore, Japanese Patents No. 3176182, 3176183, 3176184, and 3478573, JP-A-2001-018374, and JP-A-2001-150701 cannot be applied to a line head printer, because the printing head of a line head printer cannot move in a direction orthogonal to the print media feeding direction. It is desired to develop image processing for reducing banding, which is also capable of being applied to a line head printer.

SUMMARY

An advantage of some aspects of the invention is to provide image processing that is capable of reducing binarization while utilizing a low cost, simple configuration, and which imposes a low control load. A further advantage of some aspects of the invention is to provide image processing that is capable of reducing binarization, and which is also capable of being applied to a line head printer.

According to a first aspect of the invention, an image processing device has: an N-level quantization unit, where N is a natural number equal to or greater than 2, the unit converting multi-level image data into N-level image data, the multi-level image data including a plurality of pixels, each pixel having a value corresponding to one of a multi-level gradation, and the N-level image data including a size of an ideal ink dot to be formed; a memory that stores error information, the error information corresponding to a difference between an ideal ink dot and an actual ink dot, the actual ink dot being formed by an image forming device, the image forming device having a plurality of nozzles, and each of the plurality of nozzles being associated with an ideal ink dot and an actual ink dot, and being capable of ejecting M-number of ink dot sizes, where M is a natural number equal to or greater than 2 and satisfies M≧N; an error information obtaining unit that obtains from the memory error information corresponding to an identified one of the plurality of nozzles, the identified nozzle being used for image processing; a dot size determining unit that determines a size of an ink dot on the basis of the error information, the ink dot being ejected by the identified nozzle, and a size of the ink dot being determined such that a density of the ejected ink dot is approximately equal to a required density, the required density being determined by the N-level image data; and an output unit that outputs to the image forming device an instruction for causing ejection of an ink dot from the identified nozzle, the size of the ejected ink dot being determined by the dot size determining unit.

It is preferable that the error information includes size information, the size information corresponding to a difference between a size of the actual ink dot and a size of the ideal ink dot.

It is preferable that the size information includes an instruction for causing ejection of an ink dot, the instruction corresponding to a size of the ink dot to be ejected.

It is preferable that the memory further stores an instruction table, the instruction table storing a pixel value of N-level image data, a nozzle identifier for identifying a nozzle, and an instruction for causing ejection of an ink dot.

It is preferable that a pixel value of N-level image data corresponds to two or more candidates for an instruction for causing ejection of an ink dot at least in a part of the instruction table; and the dot size determining unit determines an instruction from the two or more candidates alternately, in turn, or at random.

It is preferable that the error information includes positional information, the positional information corresponding to a difference between a position at which the actual ink dot is formed and a position of the ideal ink dot.

It is preferable that the memory further stores an inter-dot density table, the inter-dot density table correspondingly storing positional information of two ink dots formed by two adjacent nozzles, a combination of dot sizes of the two ink dots, and an inter-dot density of the two ink dots, the inter-dot density being a density of ink dots in unit area; and the dot size determining unit determines a dot size on the basis of a combination of the two ink dots corresponding to the nearest inter-dot density to the required density from the inter-dot table.

It is preferable that the error information includes both size information and positional information, the size information corresponding to a difference between a dot size of the actual ink dot and a dot size of the ideal ink dot, the positional information corresponding to a difference between a position at which the actual ink dot is formed and a position of the ideal ink dot; and the dot size determining unit determines a dot size on the basis of both the size information and the positional information.

It is preferable that the error information includes density information, the density information corresponding to a difference between a density of an actual ink dot in unit area and a density of an ideal dot in unit area.

According to a second aspect of the invention, an image processing method has: converting multi-level image data into N-level image data, where N is a natural number equal to or greater than 2, the multi-level image data including a plurality of pixels, each pixel having a value corresponding to one of a multi-level gradation, and the N-level image data including a size of an ideal ink dot to be formed; obtaining from a memory, error information corresponding to a difference between an ideal ink dot and an actual ink dot relative to one of a plurality of nozzles of an image forming device, each nozzle being capable of ejecting M-number of ink dot sizes, where M is a natural number equal to or greater than 2 and satisfies, and the identified one of the plurality of nozzles being used for performing an image processing operation; determining a dot size of an ink dot on the basis of the error information, the ink dot being ejected by the identified nozzle, the dot size being determined so as to make a density of the ink dot approximately equal to a required density, the required density being determined by the N-level image data; and outputting to the image forming device an instruction for causing ejection of an ink dot from the identified nozzle.

According to a second aspect of the invention, a computer program causes a computer to execute the above image processing method.

BRIEF DESCRIPTION OF THE DRAWINGS

The invention will be described with reference to the accompanying drawings, wherein like numbers reference like elements.

FIG. 7 shows ink dots that the nozzles can eject in accordance with the first embodiment.

FIG. 10 shows an example of (a part of) image data after the binarization in accordance with the first embodiment.

FIG. 11 shows an example of image data after dot selection in accordance with the first embodiment.

FIG. 13 schematically shows deviation of the dot size in accordance with the first embodiment.

FIG. 15 shows dot sizes that the nozzles can eject in accordance with the second embodiment.

FIG. 17 shows an example of dot selection information DS in accordance with the second embodiment.

FIG. 18 shows an example of image data after the binarization in accordance with the second embodiment.

FIG. 22 shows (a part of) a table included in dot selection information DS in accordance with the third embodiment.

FIG. 23 shows an example of a table for determining parameter L

FIG. 24 shows an example of a table for determining parameter J.

FIG. 26 shows an example of image data after the binarization in accordance with the third embodiment.

FIG. 27 shows an example of instructions generated on the basis of the image data shown in FIG. 26.

FIG. 36 shows an example of the inter-dot table in accordance with the fourth embodiment.

FIG. 37 shows an example of the dot generation table in accordance with the fourth embodiment.

FIG. 44 shows an example including both deviations in dot size and deviations in position.

FIG. 45 shows an example of dot selection information DS in accordance with the fifth embodiment.

FIG. 46 shows an example schematically illustrating ink dots after the dot size selection for compensating for the deviation in dot size.

DESCRIPTION OF EXEMPLARY EMBODIMENTS

1. First Embodiment

Figure 1:
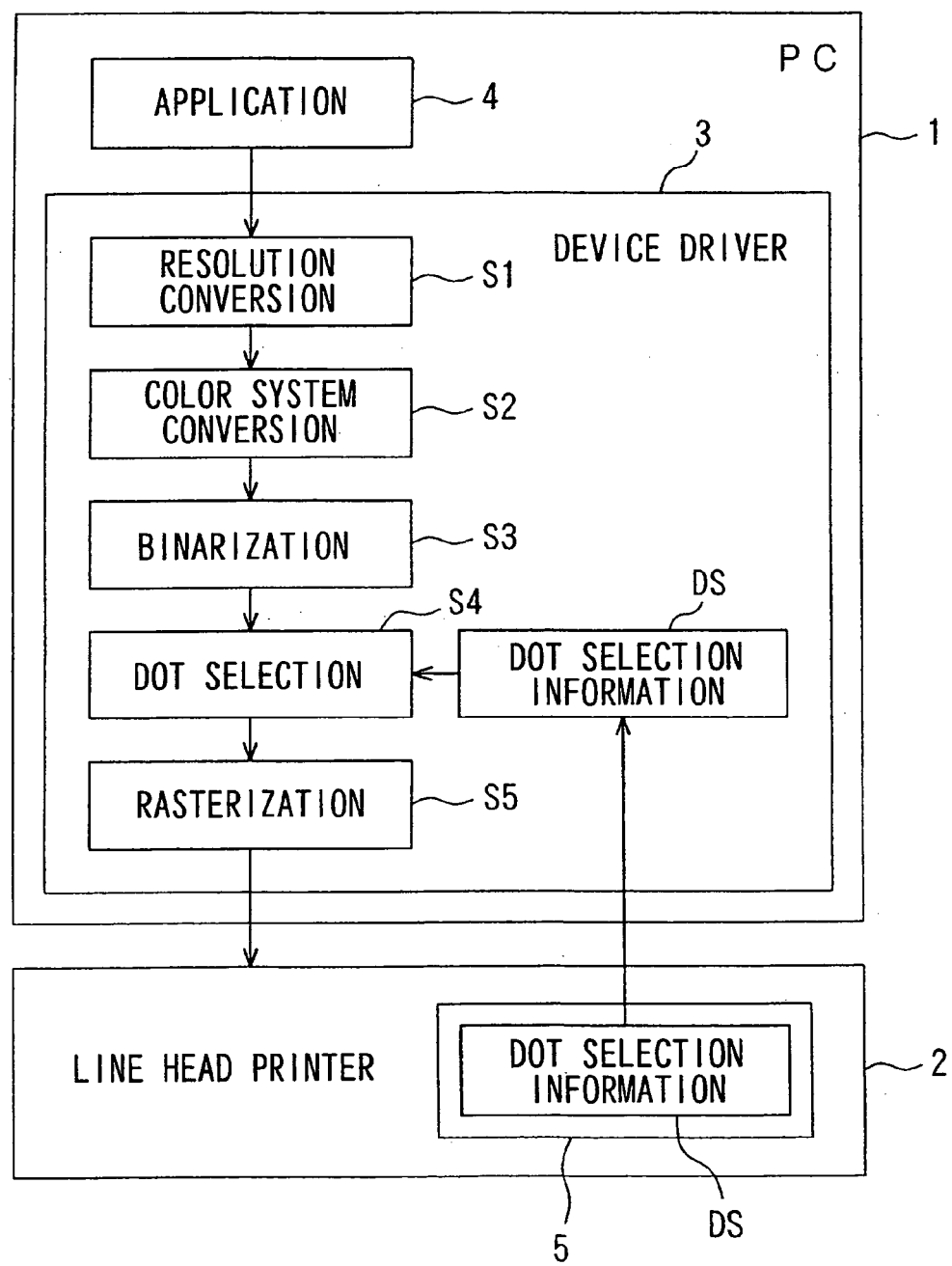
FIG. 1 shows ink jet printer 2 and personal computer 1.

FIG. 1 shows ink jet printer 2 and personal computer 1 for controlling ink jet printer 2, in accordance with the present embodiment. Device driver 3 consists of software for driving ink jet printer 2. Device driver 3 is installed in personal computer 1. Personal computer 1 controls ink jet printer 2 by executing device driver 3 in application software 4. Thus, personal computer 1 controls ink jet printer 2 to print an image.

Figure 2:
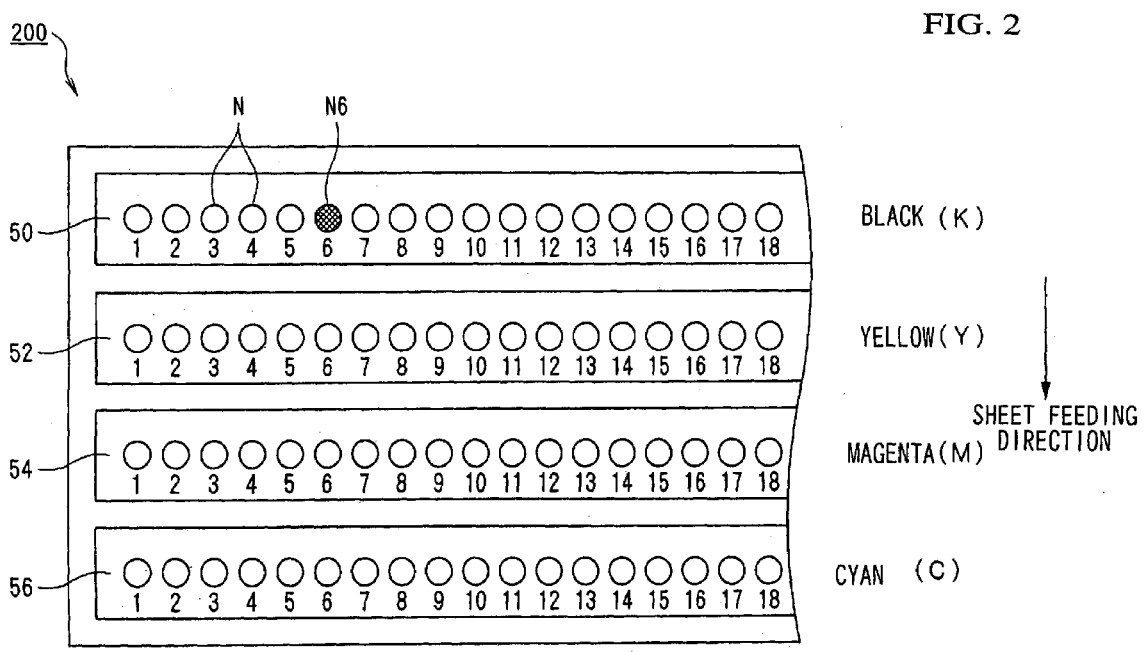
FIG. 2 shows a configuration of nozzle head 200 in ink jet printer 2.

FIG. 2 shows a configuration of nozzle head 200 in ink jet printer 2. In the present embodiment, ink jet printer 2 is a line head printer. As shown in FIG. 2, nozzle head 200 has black nozzle array 50, yellow nozzle array 52, magenta nozzle array 54, and cyan nozzle array 56. Each of black nozzle array 50, yellow nozzle array 52, magenta nozzle array 54, and cyan nozzle array 56 ejects in particle form black ink (K), yellow ink (Y), magenta ink (M), and cyan ink (C), respectively. The nozzle array has a plurality of nozzles that are laid out in a straight line. The nozzle array are laid out in a direction orthogonal to the print media feeding direction (or sheet feeding direction). Ink jet printer 2 performs single-pass printing by moving the line head unit relative to the paper in the print media feeding direction.

Figure 3:
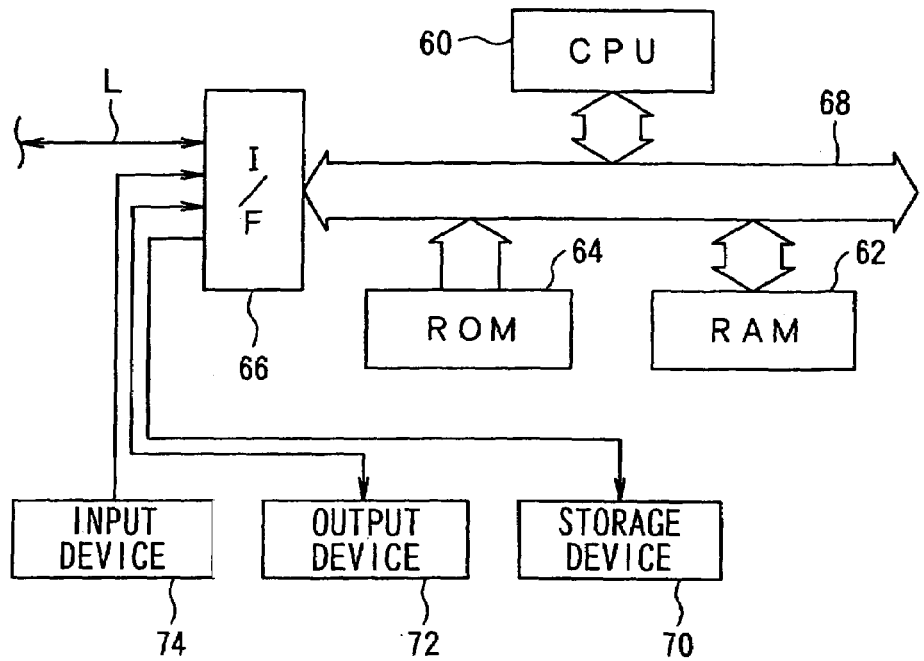
FIG. 3 is a block diagram illustrating a hardware configuration of personal computer 1.

FIG. 3 is a block diagram illustrating a hardware configuration of personal computer 1. Device driver 3 consists of software. CPU (Central Processing Unit) 60 is a controller for controlling another part of personal computer 2 and for performing calculations. RAM (Random Access Memory) 62 is a main memory. ROM (Read Only Memory) 64 is a read only memory device. Input/output interface 66 is an interface for transferring data and control signals between two elements of personal computer 2. Bus 68 is a data bus such as PCI or ISA Storage device 70 is an external memory such as HDD (Hard Disk Drive). Output device 42 is, for example, ink jet printer 1, a CRT (Cathode Ray Tube), or an LCD (Liquid Crystal Display). Input device 74 has, for example, an operation panel, a mouse, a keyboard, or an image scanner. Network L is a network for communicating with an external device such as print instruction device (not shown in the figures).

When personal computer 1 is turned on, a system program such as BIOS (Basic Input/Output System) stored in ROM 64 is executed. The BIOS loads to RAM 62 computer programs stored in ROM 64, or installed via storage media such as a CD-ROM (Compact Disk Read Only Memory), a DVD-ROM (Digital Versatile Disk Read Only Memory), or an FD (Flexible Disk). The computer programs may be installed via a network such as the Internet. By executing a computer program loaded in RAM 62, CPU 60 controls various resources and performs calculation. Thus, personal computer 1 has various functions, which will be described later. Device driver 3 may be installed in a printer controller of ink jet printer 2. Alternatively, device driver 3 may be installed in another computer device. Similarly, application software 4 for controlling device driver 3 may be installed in the printer controller of ink jet printer 2. Alternatively, application software 4 may be installed in another computer device. The function of device driver 3 and application software 4 may be realized by hardware.

First, operation of device driver 3 is described with reference to FIG. 1. By executing device driver 3, CPU 60 converts the resolution of input RGB image data. The RGB image data is input from application software 4 in step S1. The RGB image data is image data having a plurality of pixels. Each pixel has a gradation value (or brightness) in 8 bits data for each color (Red, Green, and Blue). The resolution of the RGB image data is converted into a resolution of the print image data. For example, in a case that the maximum print resolution of ink jet printer 2 is 720 dpi and the resolution of the input image data is 360 dpi, CPU 60 converts the resolution of the input image data to 720 dpi so that it conforms with the resolution of ink jet printer 2.

In step S3, CPU 60 binarizes (or quantizes) the CMYK image data. Each nozzle of ink jet printer 2 can eject a predetermined radius of an ink dot. In the present embodiment, each nozzle can eject three sizes of ink dots. "Binarization" is an operation to convert a pixel value of a target pixel from multilevel data into binary data. The binary data shows whether a predetermined size of a dot is ejected. In the present embodiment, the error diffusion method is employed for the binarization algorithm. The outline of the error diffusion method is as follows. The multilevel data is converted into binary data with reference to the threshold value. For example, if the multilevel value is above the threshold value, the binary data is determined as "1". If the multilevel value is below the threshold value, the binary data is determined as "0". According to the error diffusion method, the difference between the multilevel value and threshold value of the target pixel is diffused into unprocessed pixels. The description is given for an example of 8 bits (256-level or 256-tone) image data, pixel value "101" of a target pixel, and threshold value "127". The pixel value of the target pixel is converted into "0" because the pixel value is below the threshold value. According to a normal binarization, the difference "101" between the original pixel value (multilevel value) and the converted pixel value (binary value) is ignored. However, according to the error diffusion method, the difference is diffused into unprocessed adjacent pixels of the target pixel by using an error diffusion matrix. In the unprocessed adjacent pixels, the pixel value is updated by adding the diffused error to the original pixel value. For example, if the original pixel value of the adjacent pixel to the right of the target pixel is below the threshold value, the pixel value is converted into "0" in accordance with the normal binarization. However, if the updated pixel value of the adjacent pixel to the right of the target pixel is above the threshold value, the pixel value is converted into "1". Thus, the error diffusion method provides a high quality binary image closer to the original multilevel image. As a result of binarization, image data is converted into binary data showing whether a predetermined radius of dots is formed or not. In the present embodiment, the binarization frequency corresponds to a half of the maximum print resolution, 360 dpi in this case. It is to be noted that another binarization algorithm, such as a dither matrix method may be employed.

Here, the term "ink dot" means a particle of liquid ink comprising an image formed on a print medium. In addition, "dot radius" and "dot diameter" means a radius and a diameter of the ink dot, respectively. The greater the dot radius (or dot diameter) becomes, the greater the density of a predetermined area including a plurality of ink dots becomes. The smaller the dot radius (or dot diameter) becomes, the less the density of a predetermined area including a plurality of ink dots becomes. The term "binarization" means converting a pixel value into a density, and determining a dot diameter (dot radius) corresponding to the density. Details of binarization will be described later.

A density corresponds to an area of printed image (ink dot) per unit area. With a unit area $L^2$, a density of image formed by an ink dot having a minimum dot radius $R_{min}$ is $\pi R_{min}^2/L^2$. For example, to obtain a density of $2\pi R_{min}^2/L^2$, dot radius R can satisfy $R=\sqrt{2} \cdot R_{min}$.

In step S4, CPU 60 reads dot selection information DS stored in memory 5 of control unit of ink jet printer 2. CPU 60 selects (or determines) a dot size (or dot radius) of an ink dot to be ejected from each nozzle on the basis of dot selection information DS. Here, the term "dot size" means two-dimensional size of an ink dot, and the term "dot radius" means one-dimensional size of an ink dot. Details of operations in step S4 will be described later. Next, in step S5, CPU 60 converts the information of the dot size obtained in step S4 into machine code in conformity with the ink jet printer 2, by rasterization. The machine code includes instructions for controlling ink jet printer 2. Then, CPU 60 outputs the machine codes to the control unit of ink jet printer 2.

Figure 4:
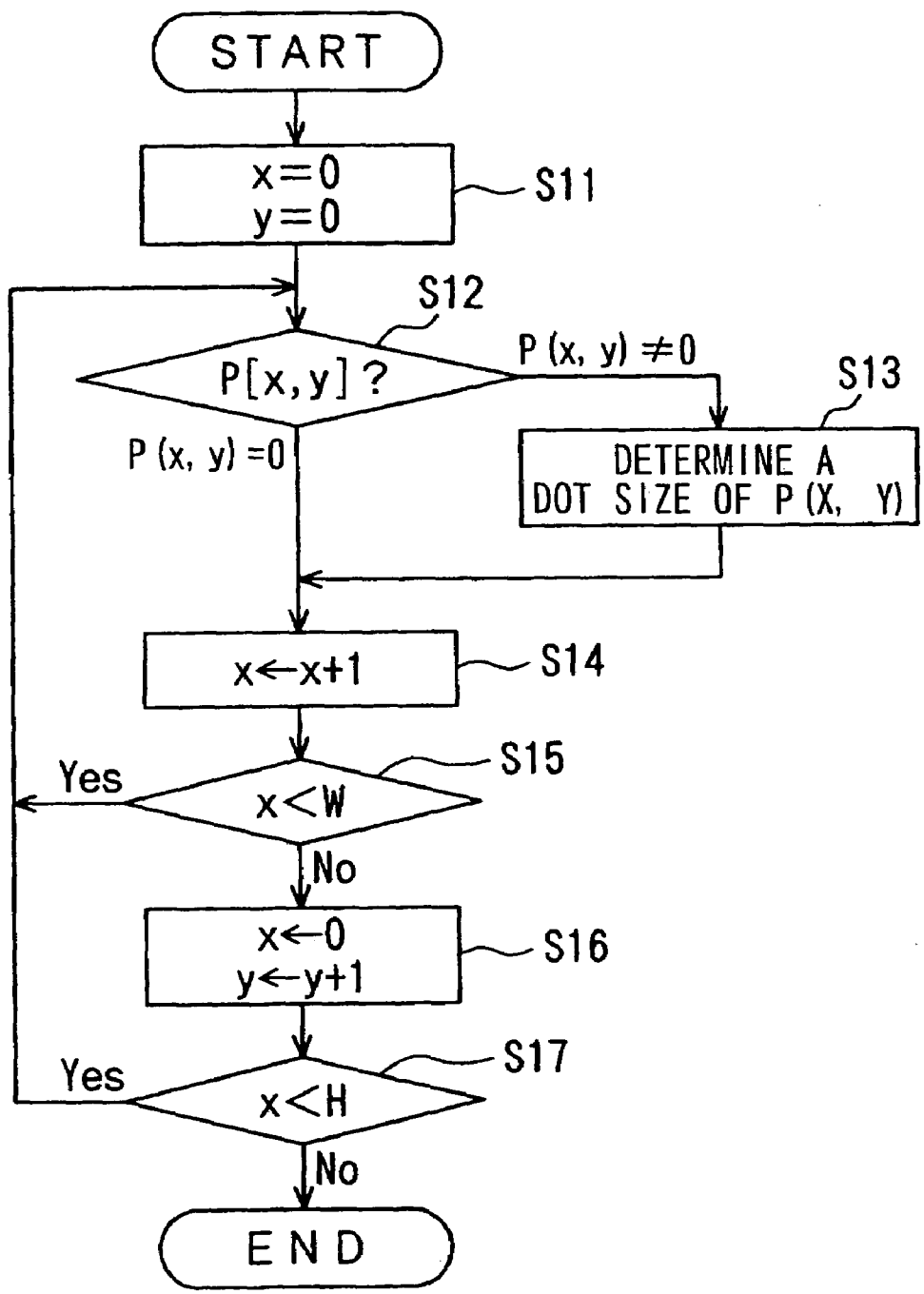
FIG. 4 is a flow chart illustrating operations for selecting a dot size in accordance with the first embodiment.

FIG. 4 is a flow chart illustrating operations for selecting a dot size in step S4. The operations are performed for each color, cyan, magenta, yellow, and black. In the following descriptions, parameters x and y denote coordinates of a pixel of print image data that is obtained by binarization in step S3. For example, as shown in FIG. 10, the left upper corner of the matrix of the print image data furnishes the point of origin of the coordinate system. The x-axis and the y-axis are defined in the right direction and the downward direction of the matrix, respectively. In the present embodiment, the matrix of the print image data has width W and height H. The width is the distance along the orthogonal direction to the sheet feeding direction and the height is the distance along the sheet feeding direction.

First, in step S11, CPU 60 initializes x and y coordinates stored in RAM 62, to zero. Next, in step S12, CPU 60 determines the next operation to be performed, on the basis of required density P(x, y). Required density P(x, y) is obtained in step S3 of FIG. 1. Specifically, in a case that the required density is not 0%, CPU 60 proceeds to the operation in step S13. In a case that the required density is 0%, CPU 60 proceeds to the operation of step S14.

In step S13, CPU 60 determines a dot size to obtain a print result that is equal to required density P(x, y). The operations in step S13 will be described in detail later. After determining the dot size, CPU 60 proceeds to the operation of step S14.

In step S14, CPU 60 updates the x coordinate as x=x+1. Next, in step S15, CPU 60 determines whether the operations are completed for a line, in other words, CPU 60 determines whether x coordinate is less than print width W. When x coordinate is less than W (in step S15: YES), CPU 60 repeats the operations of steps S12-S14. When x coordinate is greater than or equal to print width W (in step S15: NO), CPU 60 proceeds to the operation of step S16. In step S16, CPU 60 updates x and y coordinates to proceed to the operation of the next line. Specifically, CPU 60 initializes x to zero, and updates y as y=y+1. Next, in step S17, CPU 60 determines whether the operations are completed for all lines. In other words, CPU 60 determines whether y is less than print length H. When y is less than H (in step S17: YES), CPU 60 repeats the operations of steps S12-S16. When y is greater than or equal to H (in step S17: NO), CPU 60 terminates the operations in FIG. 4.

Next, the operations of step S13 in FIG. 4 are described in detail.

Figure 5:
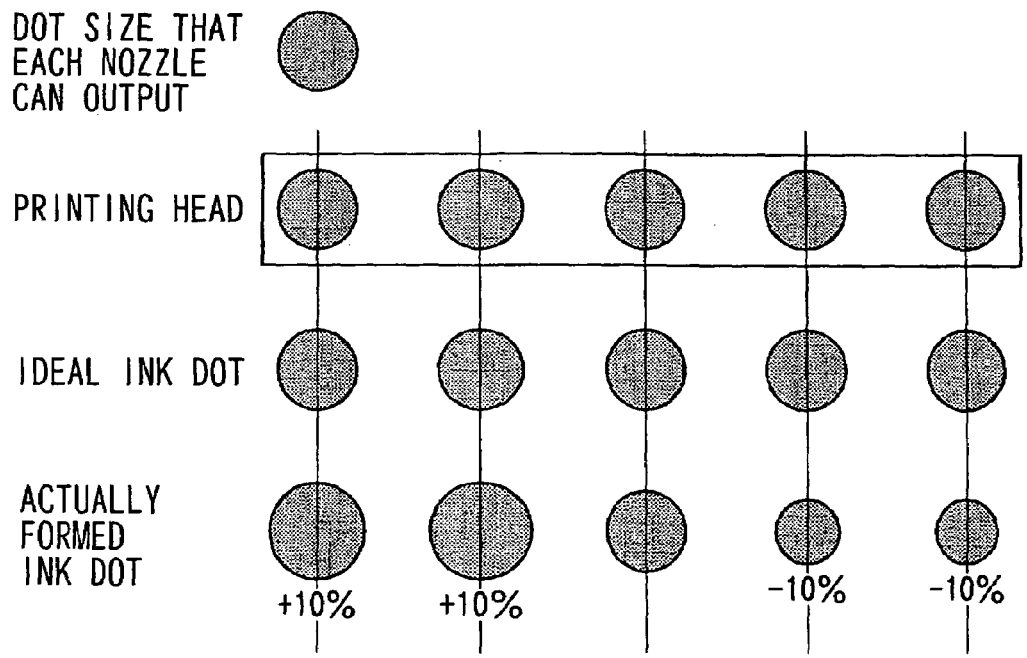
FIG. 5 shows an example of deviation in density of actually formed image in accordance with the first embodiment.
Figure 6:
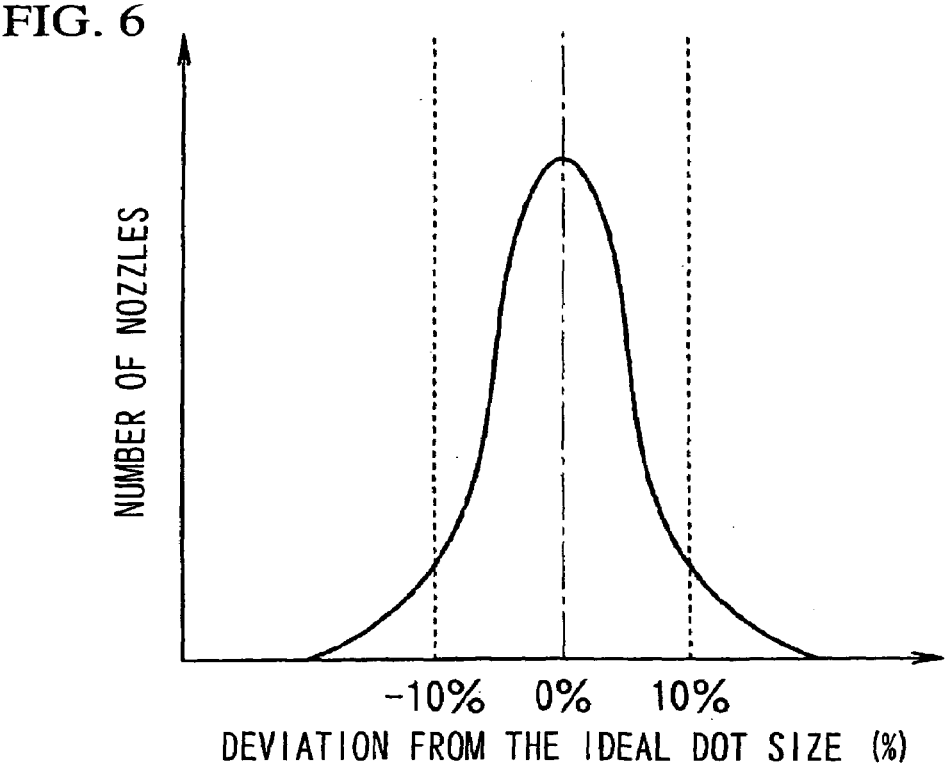
FIG. 6 shows a histogram of dot size in accordance with the first embodiment.

FIG. 5 shows an example of deviation in density of actually formed image, in other words, deviation in dot size. FIG. 6 shows a histogram of dot size. As shown in FIG. 5, dot size of an ink dot actually formed on a paper has deviation compared with the ideal dot size. In other words, dot size of an ink dot actually formed on a paper has deviation even in a case that the ideal dot size is one size. This is because of, for example, a fabrication error of a nozzle or a printing head. In the example shown in FIG. 5, an area of an ink dot formed by each of two left nozzles is 10% greater than the ideal dot area. The ideal dot area is an area of an ink dot having the ideal dot size. Similarly, an area of an ink dot formed by each of the two right nozzles is 10% less that the ideal dot area. FIG. 6 shows a histogram of dot size actually formed on a paper. Ink dots above or below the range of the ideal dot size cause inconsistencies in density. The range of the ideal dot is defined by, for example, the ideal dot size with ±10% margin.

FIG. 7 shows ink dots that the nozzles can eject. In the present embodiment, the nozzles of ink jet printer 2 can eject three sizes of ink dots, L, M, and S size ink dot. M size is equal to the ideal dot size. An area of L size ink dot is 10% greater than the area of M size ink dot. An area of S size ink dot is 10% less than the area of M size ink dot. The nozzles of the printing head shown in FIG. 7 have deviation similar to that of the nozzles shown in FIG. 5. In other words, the ink dots formed by the left two nozzles are 10% larger than the ideal ink dot and the ink dots formed by the right two nozzles are 10% smaller than the ideal ink dot. Therefore, actually formed dot size deviates from the required dot size, L, M, and S size. For example, to obtain an ink dot having the same dot size as the ideal dot size, CPU 60 can output to each of the left two nozzles an instruction for ejecting an S size ink dot. Similarly, CPU 60 can output to the center nozzle an instruction for ejecting M size ink dot, and can output to each of the right two nozzles an instruction for ejecting L size ink dot. Thus, the dot size of each ink dot actually formed by the nozzles is nearly equal to M size ink dot.

Figure 8:
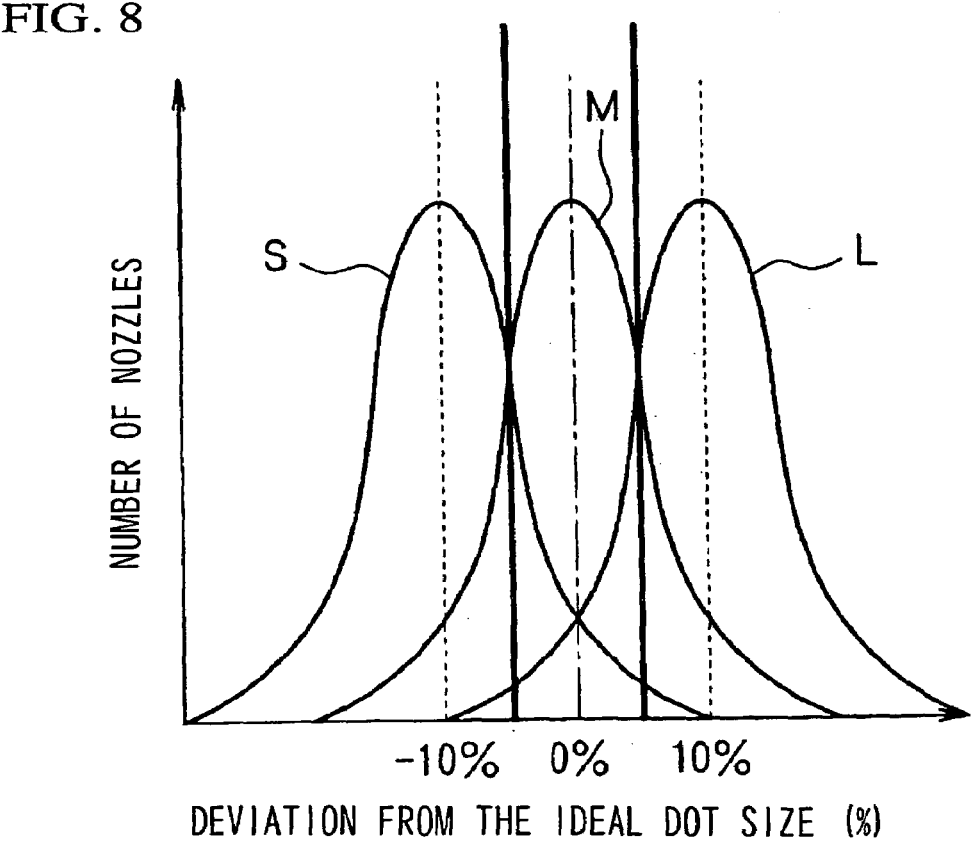
FIG. 8 shows histograms of L, M, and S size ink dot in accordance with the first embodiment.

FIG. 8 shows histograms of L, M, and S size ink dots. For a nozzle that ejects an ink dot whose dot size is more than 10% greater than the ideal dot size, CPU 60 can output to the nozzle an instruction for ejecting an S size ink dot, thereby obtaining an actually formed ink dot having a dot size in the range of the ideal dot size. Similarly, for a nozzle that ejects an ink dot the dot size of which is more than 10% less than the ideal dot size, CPU 60 can output to the nozzle an instruction for ejecting an L size ink dot, thereby obtaining an actually formed ink dot having a dot size in the range of the ideal dot size. Thus, ink jet printer 2 can compensate the deviation of the characteristics of the nozzles by calibrating required dot size in response to the deviation of the nozzles.

Figure 9:
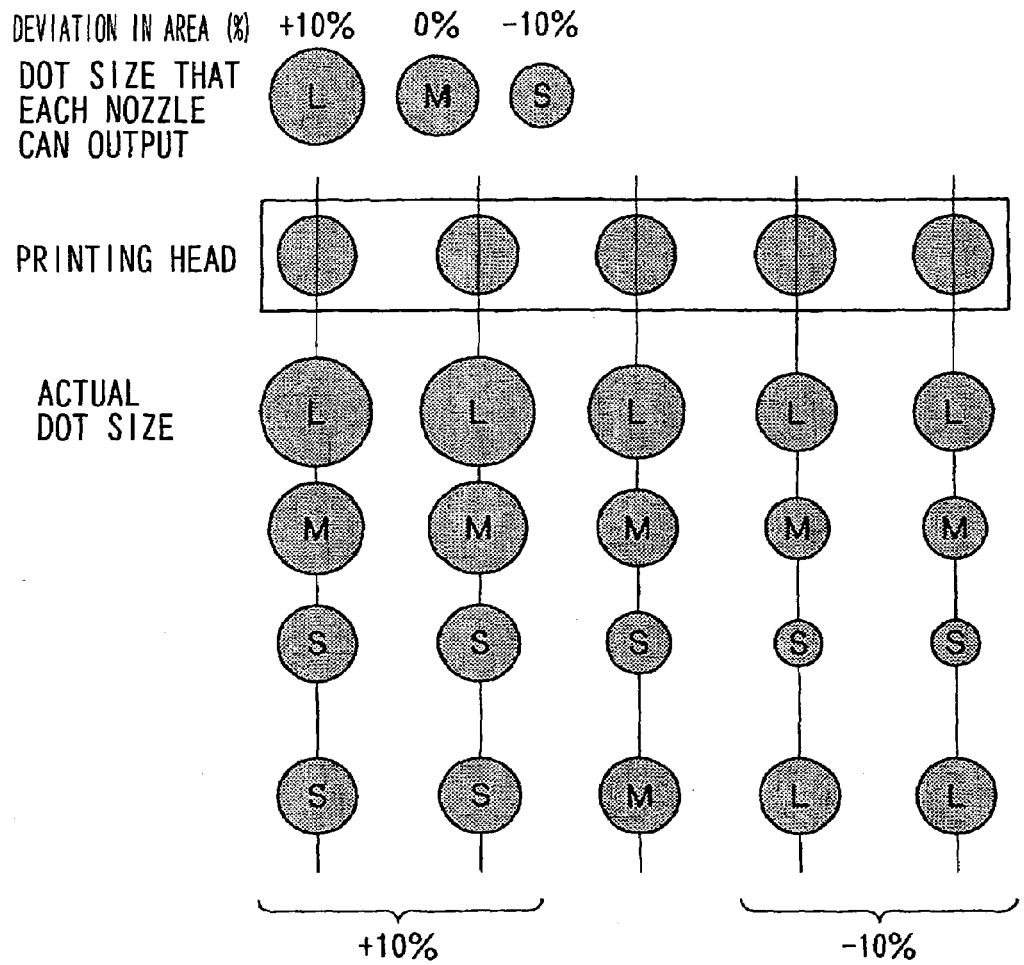
FIG. 9 shows an example of dot selection information DS in accordance with the first embodiment.

FIG. 9 shows an example of dot selection information DS. In the present embodiment, dot selection information DS includes a table that correspondingly stores a nozzle identifier NID (or x coordinate of a target pixel) and a dot size to be ejected (or an instruction for causing ejection of an ink dot). In the present embodiment, ink jet printer 2 stores in memory 5 of the control unit the table shown in FIG. 9 prior to the printing operations. CPU 60 of personal computer 1 reads dot selection information from memory 5 of ink jet printer 2 and stores dot selection information in RAM 62 or storage device 70. CPU 60 selects a dot size (or dot radius) in accordance with the table included in dot selection information DS.

Dot selection information DS is generated, for example, as follows. Personal computer 1 stores test pattern data in storage device 70. Personal computer 1 prints an image in accordance with the test pattern data. The test pattern data is data for controlling ink jet printer 2 to print a test pattern. In the test pattern data, the required dot size is M size for all pixels. The dot size of each ink dot is measured by a microscope or a dot analyzing tool. The deviation of dot size for the nozzles is shown in FIG. 6. Although the x-axis shows "deviation in density" in FIG. 6, it is similar for "deviation in dot size" or "deviation in dot area". As described above, a nozzle that ejects ink dots above or below the range of the ideal dot size causes inconsistencies in density. Therefore, information "L" is stored correspondingly to a nozzle identifier corresponding to a nozzle that ejects an ink dot below the range of the ideal dot size. Similarly, information "S" is stored correspondingly to a nozzle identifier corresponding to a nozzle that ejects an ink dot above the range of the ideal dot size. The measurement is performed for all nozzles. In the present embodiment, dot selection information DS corresponds to size information showing a difference between an actually formed dot size and the ideal dot size.

FIG. 10 shows an example of (a part of) image data after the binarization. FIG. 11 shows an example of image data after dot selection. In the example shown in FIG. 10, regarding a nozzle of x=0 (or NID=0), the binary data shows ink dots are to be formed at locations (0, 1) and (0, 3). With reference to the field corresponding to x=0 in the table of dot selection information DS shown in FIG. 9, CPU 60 determines as S size a dot size of an ink dot to be ejected from the nozzle. Regarding a nozzle of x=1, the binary data shows an ink dot is to be formed at location (1, 0). With reference to the field corresponding to x=1 in the table, CPU 60 determines as S size a dot size of an ink dot to be ejected from the nozzle. Regarding a nozzle of x=2, the binary data shows ink dots are to be formed at locations (2, 0), (2, 1), and (2, 3). With reference to the field corresponding to x=2 in the table, CPU 60 determines as M size a dot size of an ink dot to be ejected from the nozzle. Regarding a nozzle of x=3, the binary data shows an ink dot is to be formed at locations (3, 2). With reference to the field corresponding to x=3 in the table, CPU 60 determines as L size a dot size of an ink dot to be ejected from the nozzle. Regarding a nozzle of x=4, the binary data shows ink dots are to be formed at locations (4, 0), (4, 1), and (4, 3). With reference to the field corresponding to x=4 in the table, CPU 60 determines as L size a dot size of an ink dot to be ejected from the nozzle. FIG. 11 shows instructions for causing ejection of ink dots, generated as described above. CPU 60 stores the instructions in RAM 62.

Figure 12:
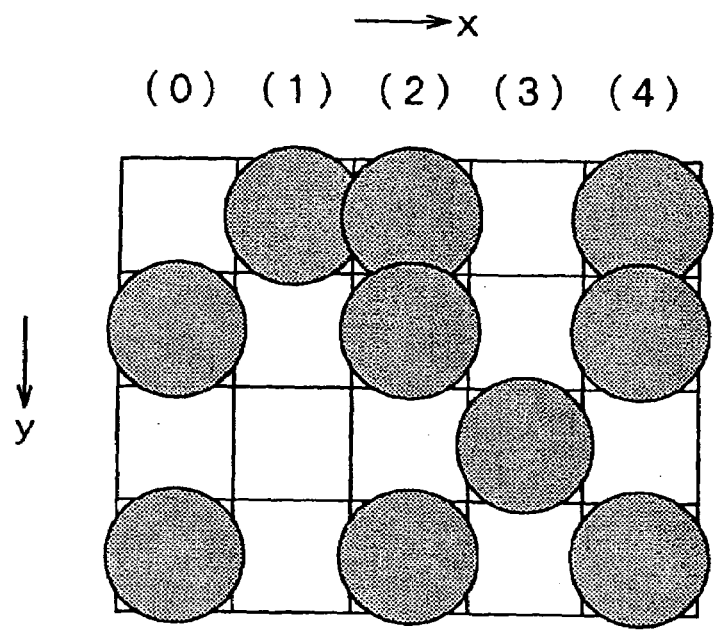
FIG. 12 shows an example of image (ink dots) formed in accordance with the instructions shown in FIG. 11.

FIG. 12 shows an example of image (ink dots) formed in accordance with the instructions shown in FIG. 11. The dot size of ink dots formed in accordance with the present embodiment are approximately constant at M size. In other words, inconsistencies in density are reduced. The present embodiment provides a print system that has an N-level quantization unit, where N is a natural number equal to or greater than 2, the unit converting multi-level image data into N-level image data, the multi-level image data including a plurality of pixels, each pixel having a value corresponding to one of a multi-level gradation, and the N-level image data including a size of an ideal ink dot to be formed; a memory that stores error information, the error information corresponding to a difference between an ideal ink dot and an actual ink dot, the actual ink dot being formed by an image forming device, the image forming device having a plurality of nozzles, and each of the plurality of nozzles being associated with an ideal ink dot and an actual ink dot, and being capable of ejecting M-number of ink dot sizes, where M is a natural number equal to or greater than 2 and satisfies M≧N an error information obtaining unit that obtains from the memory error information corresponding to an identified one of the plurality of nozzles, the identified nozzle being used for image processing; a dot size determining unit that determines a size of an ink dot on the basis of the error information, the ink dot being ejected by the identified nozzle, and a size of the ink dot being determined such that a density of the ejected ink dot is approximately equal to a required density, the required density being determined by the N-level image data; and an output unit that outputs to the image forming device an instruction for causing ejection of an ink dot from the identified nozzle, the size of the ejected ink dot being determined by the dot size determining unit. There is no necessity for each nozzle of the present embodiment to have its own gain control circuit while inconsistencies in density are reduced in an effective manner. Thus, the present embodiment provides a print system that has a simple configuration, can be fabricated at low cost, and can be driven under a low control load.

In addition, the print system determines an instruction for causing ejection of an ink dot in response to a measurement result of dot size of an ink dot actually formed on a paper. Thus, the present embodiment provides an ink dot actually formed on a paper, whose density is nearly equal to the required density, thereby reducing inconsistencies in density.

In addition, the print system stores information for generating the instructions in response to the measurement results, prior to the printing operation. The print system determines the instructions in response to the information and the required density. Thus, the print system can reduce the calculation load and can operate at low cost.

2. Second Embodiment

The second embodiment of the invention will be described in this section. The print system of the present embodiment is basically the same as that of the first embodiment shown in FIGS. 1-3. The operation for selecting a dot size (or a dot radius), which is shown in step S4 of FIG. 1, is basically the same as that of the first embodiment shown in FIG. 4. In the following description, elements common to the first embodiment will be denoted using the same reference numerals. The difference between the first embodiment and the second embodiment is the number of the ideal dot sizes (or the ideal dot radii). Specifically, there are three ideal dot sizes in the second embodiment. In the present embodiment, the number of the dot sizes determined by the binarization is three. In other words, the pixel value has 4-level including a case that no ink dot is formed. Accurately, the operation in step S3 of FIG. 1 is "4-level quantization" but it is described as "binarization" for convenience. Furthermore, in the present embodiment, the dot size selection performed in step S13 of FIG. 4 is different from that of the first embodiment.

Figure 14:
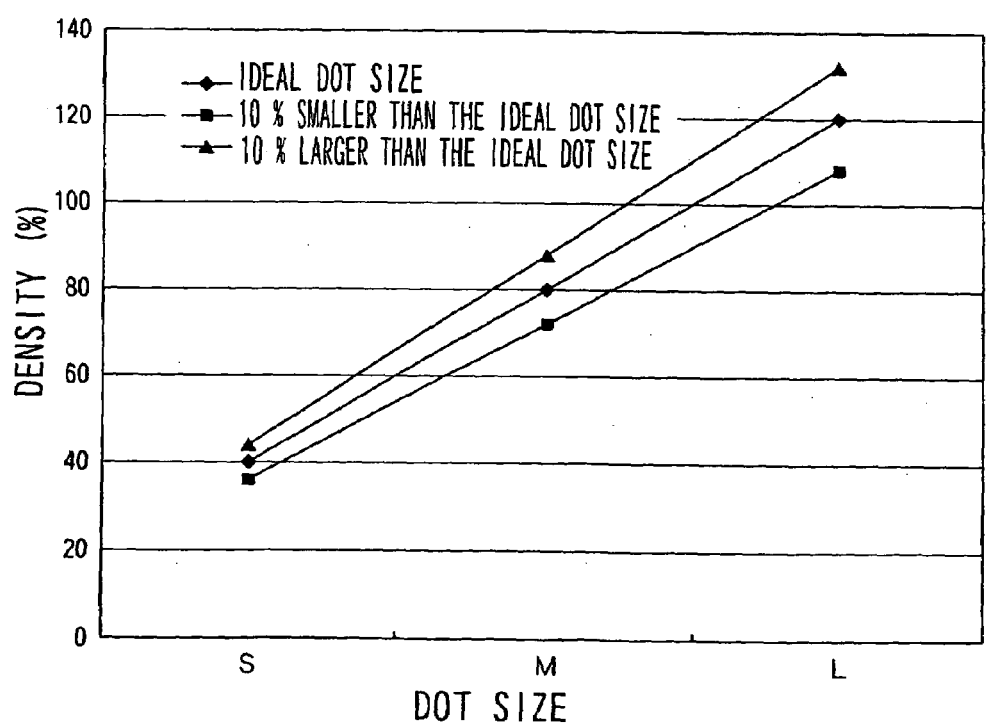
FIG. 14 shows a relation between the density and the deviation of the dot size in accordance with the first embodiment.

FIG. 13 schematically shows deviation of the dot size. FIG. 14 shows a relation between the density and the deviation of the dot size. In the present embodiment, the dot size determined by the binarization has 4-level, L, M, S size, and no dot (showing by density, 120%, 80%, 40%, and 0%, respectively). In other words, the present embodiment has three ideal dot sizes. It is to be noted that the dot sizes L, M, and S in the present embodiment each show different dot sizes from the dot sizes L, M, and S in the first embodiment. As shown in FIG. 13, the actual dot size of the dots formed by the left two nozzles is 10% larger than the ideal dot size. Also, the actual dot size of the dots formed by right two nozzles is 10% smaller than the ideal dot size. The deviations are common for all ideal dot sizes, L, M, and S. The deviations are shown in FIG. 14. Again, in other words the amount of the deviation, is constant for a nozzle. Therefore, the density and the dot size show a linear relation.

FIG. 15 shows dot sizes that the nozzles can eject in the present embodiment. The nozzles of ink jet printer 2 can eject nine sizes of dots, LL, LM, LS, ML, MM, MS, SL, SM, and SS size.

Figure 16:
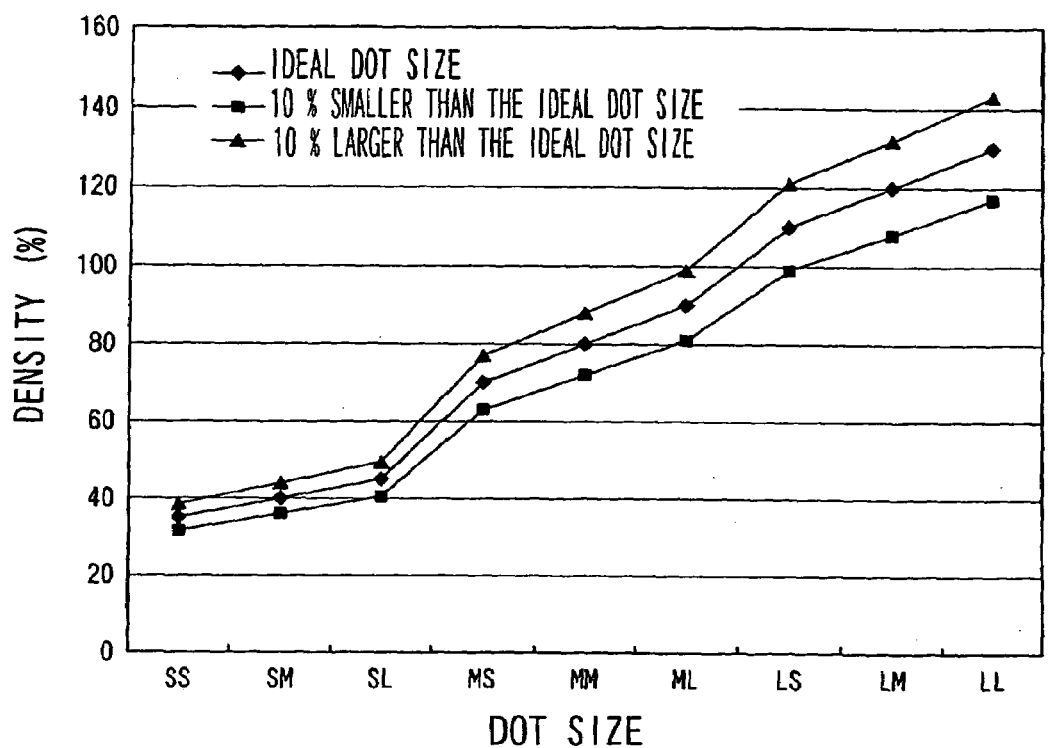
FIG. 16 shows a relationship between density and dot size in accordance with the second embodiment.

FIG. 16 shows a relationship between density and dot size. Dot size LM corresponds to a density of 120%, the ideal dot size. Dot size LL is 10% larger than dot size LM. Dot size LS is 10% smaller than dot size LM. Similarly, dot size MM corresponds to a density of 80%, the ideal dot size. Dot size ML is 10% larger than dot size MM. Dot size MS is 10% smaller than dot size MM. Furthermore, dot size SM corresponds to a density of 40%, the ideal dot size. Dot size SL is 10% larger than dot size SM. Dot size SS is 10% smaller than dot size SM.

A description will be given with reference to FIG. 15 again. To obtain a print of the ideal dot size of L size ink dot, in other words, to obtain a print of a dot having the same dot size as dot size LM, the left two nozzles can eject an LS size ink dot. Furthermore, the center nozzle can eject an LM size ink dot and the right two nozzles can eject an LL size ink dot. Thus, all the dot sizes of the ink dot actually formed on a paper are the same as dot size LM, the ideal dot size. Similarly, to obtain a print of the ideal dot size of M size ink dot, in other words, to obtain a print of a dot having the same dot size as dot size MM, the left two nozzles can eject an MS size ink dot. Furthermore, the center nozzle can eject an MM size ink dot and the right two nozzles can eject an ML size ink dot. Thus, all the dot sizes of the ink dot actually formed on a paper have dot size MM, the ideal dot size. Similarly, to obtain a print of the ideal dot size of an S size ink dot, in other words, to obtain a print of a dot having the same dot size as dot size SM, each of the left two nozzles can eject an SS size ink dot. Furthermore, the center nozzle can eject an SM size ink dot and each of the right two nozzles can eject an SL size ink dot. Thus, all the dot sizes of the ink dot actually formed on a paper are the same as dot size SM, the ideal dot size.

FIG. 17 shows an example of dot selection information DS in accordance with the present embodiment. Dot selection information includes a table correspondingly storing nozzle identifier NID (in other words, x coordinate of a target pixel), the required dot size, and a dot size to be selected (in other words, an instruction for causing ejection of an ink dot). Ink jet printer 2 stores dot selection information DS in memory 5 of the control unit prior to the printing operation. CPU 60 of personal computer 1 reads dot selection information DS from memory 5. CPU 60 stores dot selection information DS in RAM 62 or storage device 70. CPU 60 refers to dot selection information DS to select a dot size.

Figure 19:
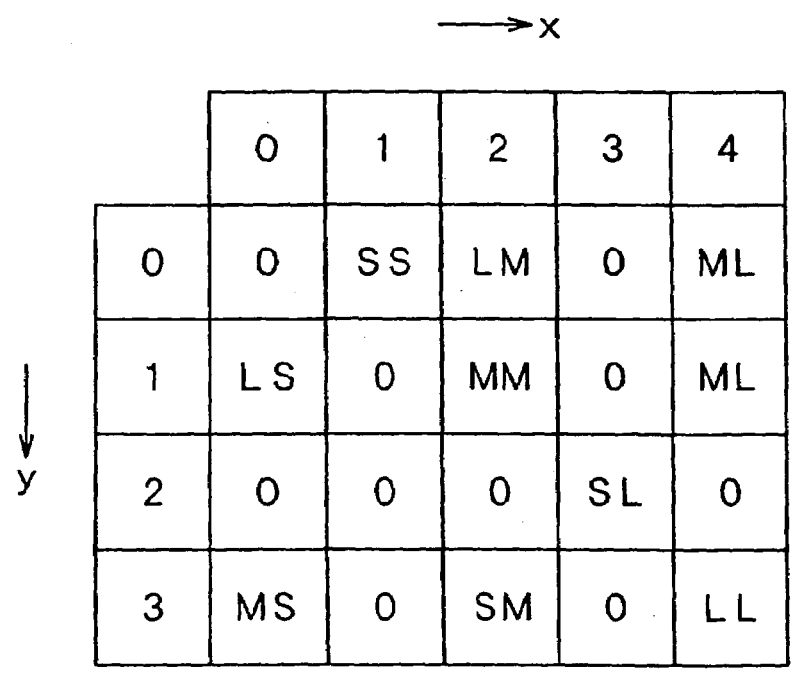
FIG. 19 shows data after the dot size selection is completed for the image data shown in FIG. 18.

FIG. 18 shows an example of image data after the binarization. FIG. 19 shows data after the dot size selection is completed for the image data shown in FIG. 18. As a result of the binarization, data showing that the L size ink dot is formed at location (0, 1) is generated, for example. As shown in FIG. 19, CPU 60 selects dot size LS as an instruction for causing ejection of an ink dot from a column corresponding to a nozzle of NID=0 and a row corresponding to required dot size L of the table shown in FIG. 17. Similarly, as shown in FIG. 18, data showing that the M size ink dot is formed at location (0, 3) is generated as a result of the binarization. As shown in FIG. 19, CPU 60 selects dot size MS as an instruction for causing ejection of an ink dot from a column corresponding to a nozzle of NID=0 and a row corresponding to required dot size M of the table shown in FIG. 17. Similarly, as shown in FIG. 18, data showing that the S size ink dot is formed at location (1, 0) is generated as a result of the binarization. As shown in FIG. 19, CPU 60 selects dot size SS as an instruction for causing ejection of an ink dot from a column corresponding to a nozzle of NID=1 and a row corresponding to required dot size S of the table shown in FIG. 17. Similarly, as shown in FIG. 18, data showing that the L size ink dot is formed at location (2, 0) is generated as a result of the binarization. As shown in FIG. 19, CPU 60 selects dot size LM as an instruction for causing ejection of an ink dot from a column corresponding to a nozzle of NID=2 and a row corresponding to required dot size L of the table shown in FIG. 17. Similarly, as shown in FIG. 18, data showing that the M size ink dot is formed at location (2, 1) is generated as a result of the binarization. As shown in FIG. 19, CPU 60 selects dot size MM as an instruction for causing ejection of an ink dot from a column corresponding to a nozzle of NID=2 and a row corresponding to required dot size M of the table shown in FIG. 17. Similarly, as shown in FIG. 18, data showing that the S size ink dot is formed at location (2, 3) is generated as a result of the binarization. As shown in FIG. 19, CPU 60 selects dot size SM as an instruction for causing ejection of an ink dot from a column corresponding to a nozzle of NID=2 and a row corresponding to required dot size S of the table shown in FIG. 17. Similarly, as shown in FIG. 18, data showing that the S size ink dot is formed at location (3, 2) is generated as a result of the binarization. As shown in FIG. 19, CPU 60 selects dot size SL as an instruction for causing ejection of an ink dot from a column corresponding to a nozzle of NID=3 and a row corresponding to required dot size S of the table shown in FIG. 17. Similarly, as shown in FIG. 18, data showing that the M size ink dot is formed at locations (4, 0) and (4, 1) are generated as a result of the binarization. As shown in FIG. 19, CPU 60 selects dot size ML as an instruction for causing ejection of an ink dot from a column corresponding to a nozzle of NID=3 and a row corresponding to required dot size M of the table shown in FIG. 17. Similarly, as shown in FIG. 18, data showing that the L size ink dot is formed at location (4, 3) is generated as a result of the binarization. As shown in FIG. 19, CPU 60 selects dot size LL as an instruction for causing ejection of an ink dot from a column corresponding to a nozzle of NID=4 and a row corresponding to required dot size L of the table shown in FIG. 17.

Figure 20:
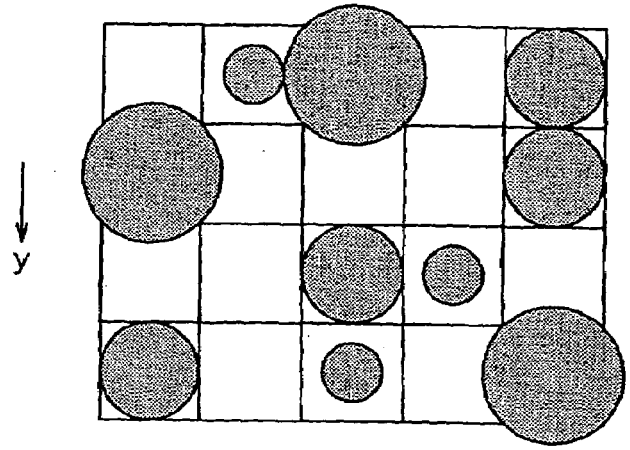
FIG. 20 shows an example pattern formed in accordance with the instructions shown in FIG. 19.

FIG. 20 shows an example pattern formed in accordance with the instructions shown in FIG. 19. The dots formed in accordance with the present embodiment are approximately equal to the required dot size. In other words, inconsistencies in density are decreased in accordance with the present embodiment.

3. Third Embodiment

The third embodiment of the invention will be described in this section. The print system of the present embodiment is basically the same as that of the first embodiment shown in FIGS. 1-3. The operation for selecting a dot size (or a dot radius), which is shown in step S4 of FIG. 1, is basically the same as that of the first embodiment shown in FIG. 4. In the following descriptions, elements common to the first embodiment will be denoted using the same reference numerals. In the present embodiment, a pixel value of image data is converted into 4-level value, L size ink dot, M size ink dot, S size ink dot, and no ink dot. Accurately, the operation in step S3 of FIG. 1 is "4-level quantization" but it is described as "binarization" for convenience. In the present embodiment, the nozzles of ink jet printer 2 can eject seven radii of ink dots. In other words, the nozzles can output 8-level of gradations, including no ink dot, as well as the seven radii of ink dots. Therefore, the dot size selection in step S13 shown in FIG. 4 is different from that of the first embodiment.

Figure 21:
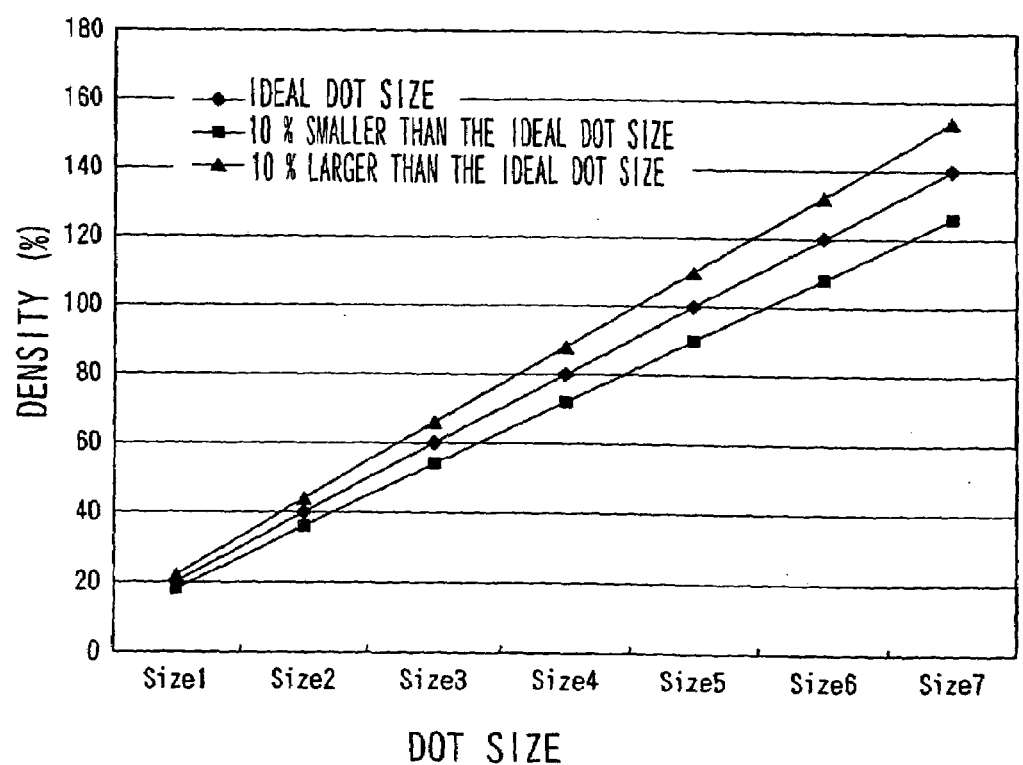
FIG. 21 shows a relationship between density and dot size in accordance with the third embodiment.

FIG. 21 shows a relationship between density and dot size in the present embodiment. In the first and the second embodiment, the dot size is determined in response to the deviation in dot size actually formed on a paper; in other words, in response to inconsistencies in density. In the present embodiment, the nozzles can eject seven dot sizes of ink dots, which correspond to an ideal density of 20%, 40%, 60%, 80%, 100%, 120%, and 140%. In the following descriptions, the dot sizes corresponding to these densities are denoted as Size 1, Size 2, . . . , Size 7, in ascending order. In the present embodiment, the dot size actually formed on a paper deviates in a range of, for example, +10% through −10%.

For example, in a range of dot sizes from Size 1 to Size 3, the actual difference in density is small even though there is deviation in the size of the ink dots. On the contrary, in a case that the dot size is larger than or equal to size 4, the actual difference in density is large. For example, for a nozzle whose deviation is −10% compared with the ideal dot size (in area), the nozzle can eject different sizes of dots alternately, in turn, or at random. Specifically, in a case that the required dot size is Size 4, the nozzle can alternately eject a size 4 ink dot and an ink dot of size 5 to obtain print density nearly equal to the ideal print density. Similarly, in a case that the required dot size is size 6, the nozzle can alternately eject a size 6 ink dot and an ink dot of size 7 to obtain print density nearly equal to the ideal print density. As a further example, for a nozzle whose deviation is +10% compared with the ideal dot size and in a case that the required dot size is size 6, the nozzle can alternately eject a size 6 ink dot and an ink dot of size 7 to obtain print density nearly equal to the ideal print density.

FIG. 22 shows (a part of) a table included in dot selection information DS in accordance with the present embodiment. In the present embodiment, the table has ten patterns of information for selecting a dot size, including seven patterns of information for selecting an ideal dot size as well as three patterns of information for selecting a pair of ideal dot sizes. In the table shown in FIG. 22, I, J, and K denote parameters for selecting a dot size. In a case that parameter I satisfies $0 \leq I \leq 6$, parameter I corresponds to K=1. Parameter K denotes the number of dot sizes to be selected. Information corresponding to K=1 is information to select an ideal dot size. For example, in a case of I=0, the required dot size is size 1 and dot size of size 1 is selected as an instruction for causing ejection of an ink dot. In a case of I=1, the required dot size is size 2 and dot size of size 2 is selected as the instruction.

Information corresponding to K=2 is information to select a pair of dot sizes. In the table shown in FIG. 22, information corresponding to $7 \leq I \leq 9$ corresponds to K=2. For example, information corresponding to I=7 corresponds to the required dot size of size 4. The information corresponding to I=7 is dot selection information for a nozzle whose deviation is −10% compared with the ideal dot size. In a case of I=7, dot size of size 4 and size 5 are selected. As a further example, information corresponding to I=8 corresponds to the required dot size of size 6. The information corresponding to I=8 is dot selection information for a nozzle whose deviation is +10% compared with the ideal dot size. In a case of I=8, dot size of size 5 and size 6 are selected. Furthermore, information corresponding to I=9 corresponds to the required dot size of size 6. The information corresponding to I=9 is dot selection information for a nozzle whose deviation is −10% compared with the ideal dot size. In a case of I=9, dot sizes size 6 and size 7 are selected.

FIG. 23 shows an example of a table for determining parameter I. In FIG. 23, nozzle identifier 0 and 1 correspond to nozzles whose deviation is −10% compared with the ideal dot size. Nozzle identifier 2 corresponds to a nozzle which has no deviation compared with the ideal dot size. Nozzle identifiers 3 and 4 correspond to nozzles whose deviation is +10% compared with the ideal dot size. In the present embodiment, the required dot size obtained by the binarization has 3-level, L, M, and S size. According to the table shown in FIG. 23, parameter I is determined on the basis of the nozzle identifier and the required dot size. The required dot sizes L, M, and S correspond to densities of 120%, 80%, and 40%, respectively. In other words, the required dot sizes L, M, and S correspond to dot sizes of size 2, size 4, and size 6, respectively.

FIG. 24 shows an example of a table for determining parameter J. For example, in a case of K=2, two dot sizes are candidates for the instruction for causing ejection of an ink dot. Parameter J is a parameter for determining which dot size, of the two candidate radii, is to be ejected. The table shown in FIG. 24 is updated when a dot size corresponding to K=2 is selected. For example, in a case that the nozzle identifier is 4 and the required dot size is L, I=8 is determined in accordance with the table shown in FIG. 23. Furthermore, according to the table shown in FIG. 22, size 5 and size 6 are selected as candidates for the instruction. Parameter J determines which dot size of size 5 and Size 6 is selected as the instruction. In this case, J=1 is obtained for the nozzle identifier NID=4 and the required dot size=L from the table shown in FIG. 24. After the dot size is determined as the instruction, the value of the field in the table is updated. In other words, the value is updated from 0 to 1, or from 1 to 0. In the example shown in FIG. 24, the value of the field corresponding to nozzle identifier NID=4 and the required dot size=L is updated from J=1 to J=0. Thus, one dot size is selected alternately from the two candidates.

Ink jet printer 2 stores the tables shown in FIGS. 22 and 23 prior to the printing operation. Personal computer 1 read the tables from ink jet printer 2 and stores the tables in RAM 62 or storage device 70 either before or at the time of performing the operations shown in FIG. 4.

Figure 25:
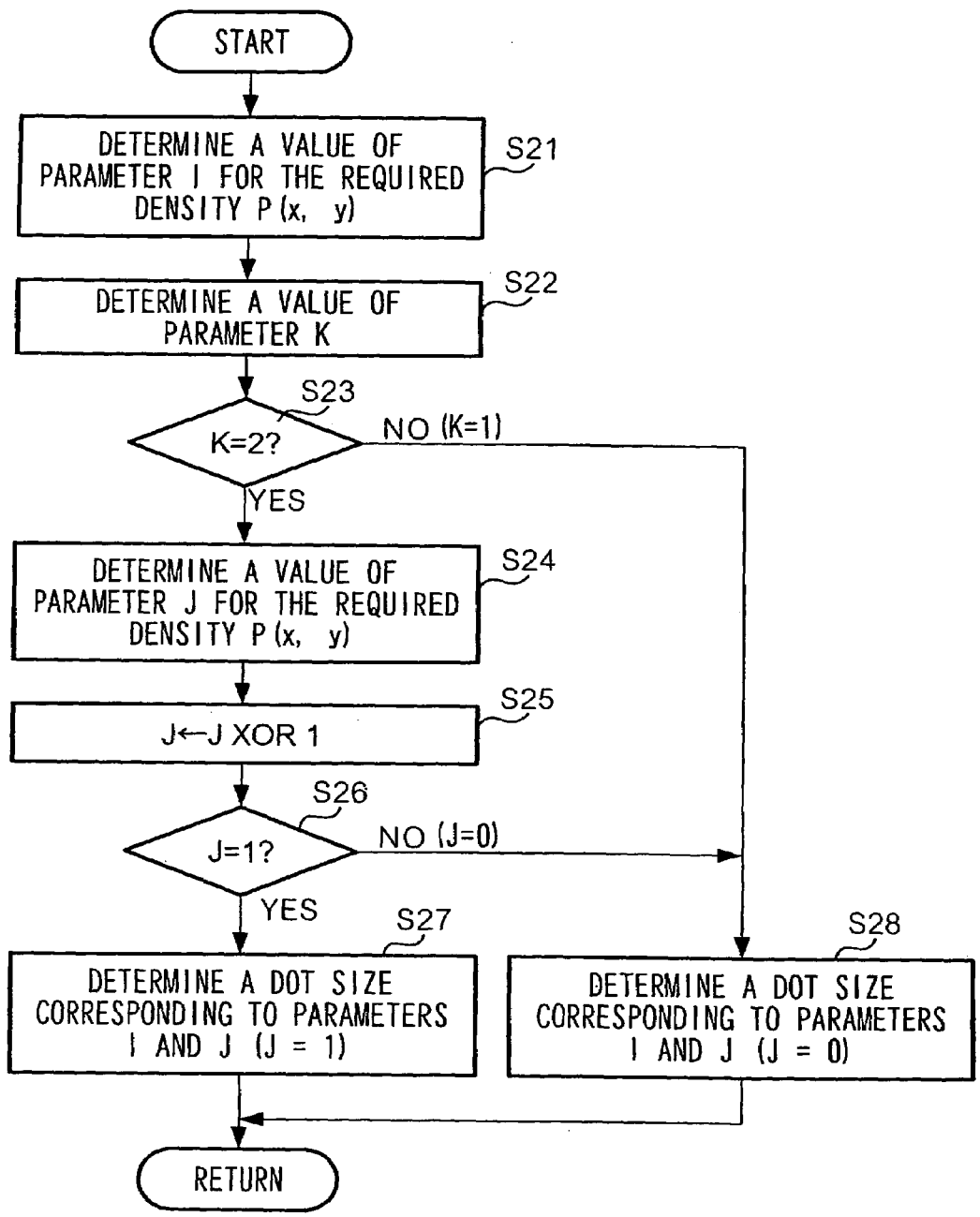
FIG. 25 shows a flow chart of dot size determination in accordance with the third embodiment.

FIG. 25 shows a flow chart of dot size determination in accordance with the present embodiment. The flow chart shown in FIG. 25 corresponds to a sub routine of step S13 in FIG. 4. First, in step S21, CPU 60 refers to the table shown in FIG. 23 to determine a value of parameter I for the required density P(x, y). Next, in step S22, CPU 60 determine a value of parameter K on the basis of the table shown in FIG. 22 and parameter I determined in step S21. Then, in step S23, CPU 60 determines whether parameter K satisfies K=2. In a case of K=2 (in step S23: YES), CPU 60 proceeds to step S24. In a case of K≠2 (in step S23: NO), CPU 60 proceeds to step S28.

In step S24, CPU 60 determines a value of parameter J on the basis of the table shown in FIG. 24, the x coordinate of the pixel, and the required density P(x, y). Next, in step S25, CPU 60 inverts parameter J by using exclusive disjunction (XOR). Furthermore, CPU 60 updates the corresponding field of the table shown in FIG. 24, to updated parameter J. Then, in step S26, CPU 60 determines whether updated parameter J satisfies J=1. In a case of J=1 (in step S26: YES), CPU 60 proceeds to step S27. In a case of J≠1 (in step S26: NO), in other words, in a case of J=0, CPU 60 proceeds to step S28.

In step S27, CPU 60 refers to the table shown in FIG. 22 to determine a dot size corresponding to parameters I and J (J=1 in this step), as an instruction for causing ejection of an ink dot. In step S28, CPU 60 refers to the table shown in FIG. 22 to determine a dot size corresponding to parameters I and J (J=0 in this step), as the instruction. After the dot size is determined, CPU 60 terminates the operations shown in FIG. 25, in other words, CPU 60 proceeds to step S14 in FIG. 4.

FIG. 26 shows an example of image data after the binarization. FIG. 27 shows an example of instructions generated on the basis of the image data shown in FIG. 26. In the present embodiment, the operations are initiated starting from a pixel located at the left-upper corner of the image data. The operations then proceed to a pixel subsequent to the previous target pixel. When the operations are completed for a line, the operations proceed for the next line. In the example shown in FIG. 26, the image data shows that an S size ink dot is required to be formed at location (1, 0). In this case, parameter I is determined as I=1 on the basis of the table shown in FIG. 23. Also, parameter K is determined as K=1 on the basis of the table shown in FIG. 22. Furthermore, parameter J is determined as J=0 on the basis of the table shown in FIG. 24. In this case, J is not inverted (or not updated) because K≠2. Therefore, as shown in FIG. 27, size 1 is selected as an instruction for selecting a dot size, on the basis of the table shown in FIG. 22. As a further example, the image data shows that an L size ink dot is required to be formed at location (2, 0) as shown in FIG. 26. In this case, parameter I is determined as I=5 on the basis of the table shown in FIG. 23. Also, parameter K is determined as K=1 on the basis of the table shown in FIG. 22. Furthermore, parameter J is determined as J=0 on the basis of the table shown in FIG. 24. Therefore, as shown in FIG. 27, size 6 is selected as an instruction for selecting a dot size, on the basis of the table shown in FIG. 22. As still another example, the image data shows that an M size ink dot is required to be formed at location (4, 0) as shown in FIG. 26. In this case, parameter I is determined as I=3 on the basis of the table shown in FIG. 23. Also, parameter K is determined as K=1 on the basis of the table shown in FIG. 22. Furthermore, parameter J is determined as J=0 on the basis of the table shown in FIG. 24. Therefore, as shown in FIG. 27, size 4 is selected as an instruction for selecting a dot size, on the basis of the table shown in FIG. 22. The dot size is similarly determined for other pixels, for example, pixels (2, 1), (4, 1), and (0, 3), the required dot size for which is M size, and pixels (3, 2) and (2, 3), the required dot size for which is S size.

In the example shown in FIG. 26, the image data shows that an L size ink dot is required to be formed at location (0, 1). In this case, parameter I is determined as I=9 on the basis of the table shown in FIG. 23. Also, parameter K is determined as K=2 on the basis of the table shown in FIG. 22. Furthermore, parameter J is determined as J=0 on the basis of the table shown in FIG. 24. In this case, J is inverted (or updated to J=1). Therefore, as shown in FIG. 27, size 7 is selected as an instruction for selecting a dot size, on the basis of the table shown in FIG. 22. As a further example, the image data shows that an L size ink dot is required to be formed at location (0, 2) as shown in FIG. 26. In this case, parameter I is determined as I=9 on the basis of the table shown in FIG. 23. Also, parameter K is determined as K=2 on the basis of the table shown in FIG. 22. Furthermore, parameter J is determined as J=1 (updated value) on the basis of the table shown in FIG. 24. In this case, J is inverted (or updated to J=0). Therefore, as shown in FIG. 27, size 6 is selected as an instruction for selecting a dot size, on the basis of the table shown in FIG. 22. As still another example, the image data shows that an L size ink dot is required to be formed at location (4, 3) as shown in FIG. 26. In this case, parameter I is determined as I=8 on the basis of the table shown in FIG. 23. Also, parameter K is determined as K=2 on the basis of the table shown in FIG. 22. Furthermore, parameter J is determined as J=1 on the basis of the table shown in FIG. 24. In this case, J is inverted (or updated to J=0). Therefore, as shown in FIG. 27, size 5 is selected as an instruction for selecting a dot size, on the basis of the table shown in FIG. 22.

As described above, according to the image processing device of the present embodiment, technical effects additional to those described in the first and the second embodiment are provided. In the present embodiment, in a case that a nozzle has a large deviation, a dot size is selected from two candidates of dot size alternately, in turn, or at random. Thus, the actual density of an image formed by the present embodiment is approximately equal to the ideal density and inconsistencies in density are effectively reduced.

4. Fourth Embodiment

The fourth embodiment of the invention will be described in this section. The print system of the present embodiment is basically the same as that of the first embodiment shown in FIG. 1. In the following descriptions, elements common to the first embodiment will be denoted by the same reference numerals.

Figure 28:
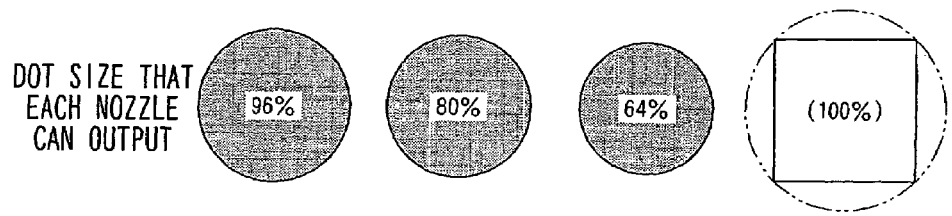
FIG. 28 shows dot sizes that the nozzles are capable of ejecting in accordance with the fourth embodiment.

FIG. 28 shows dot sizes that the nozzles are capable of ejecting in the present embodiment. The configuration of the printing head of ink jet printer 2 is the same as that of the printing head 200 shown in FIG. 2. The density of an ink dot is defined as follows. When an ink dot covers the whole of a predetermined unit area (a unit cell of a printing matrix), the density is determined as 100% as shown in FIG. 28. The nozzles can eject three radii of ink dots. The dot size of the middle size ink dot corresponds to a density of 80%. The dot size of the large size ink dot corresponds to a density of 96%, 20% larger than the middle size. The dot size of the small size ink dot corresponds to a density of 64%, 20% smaller than the middle size. As described above, dot size (dot radius) of an ink dot corresponds to a density of the ink dot. As will be described later, a pixel value of the image data is converted into binary data showing whether an ink dot corresponding to a density of 80%, the ideal ink dot, is ejected. In other words, the number of the ideal dot sizes is less than the number of dot sizes of ink dots that the nozzle is capable of ejecting.

In the present embodiment, the operations of device driver 3 are basically the same as those of the first embodiment, steps S1-S5 shown in FIG. 1 and steps S11-S17 shown in FIG. 4. In the present embodiment, the dot size determination in step S13 of FIG. 4 is different from that of the first embodiment.

Figure 29:
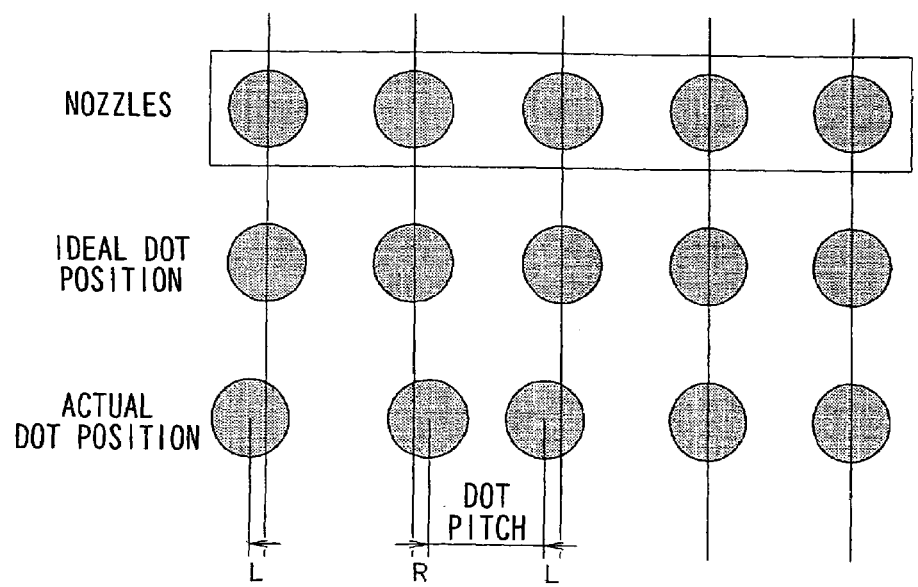
FIG. 29 shows an example of deviation in position of ink dots actually formed on a paper in accordance with the fourth embodiment.
Figure 30:
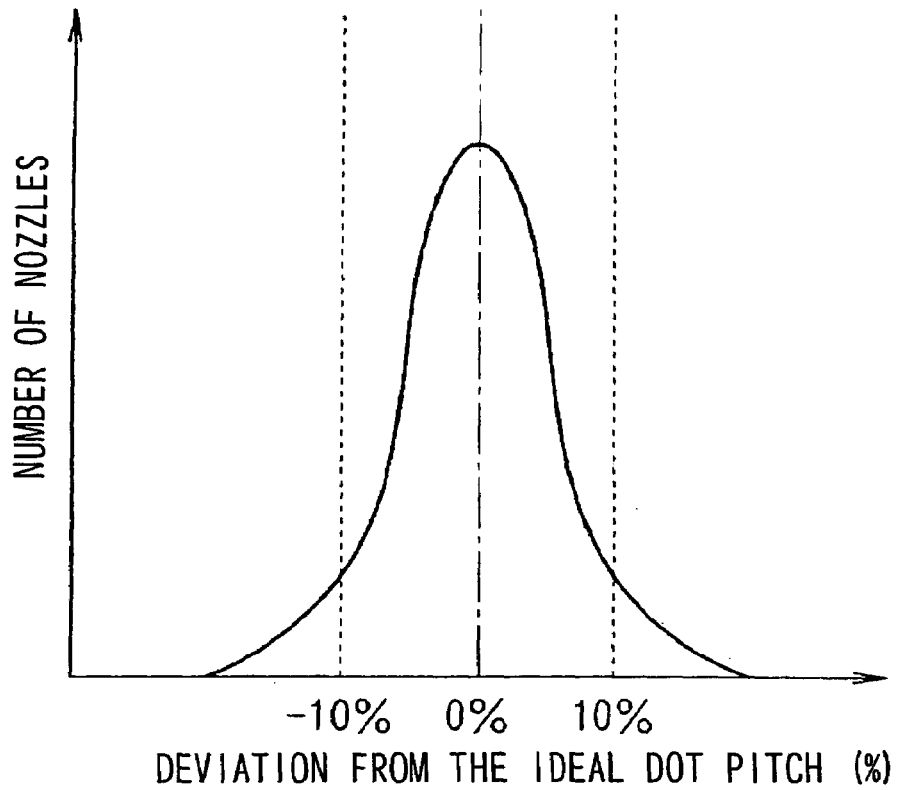
FIG. 30 shows a histogram of the deviation of the dot pitch in accordance with the fourth embodiment.

FIG. 29 shows an example of deviation in position of ink dots actually formed on a paper. FIG. 30 shows a histogram of the deviation of the dot pitch. The dot pitch means a distance between two adjacent ink dots. The position of ink dots actually formed on a paper has some deviation compared with the ideal position, because of the characteristics of the nozzles. For example, an ink dot denoted by "L" deviates to the left of the ideal position. Similarly, an ink dot denoted by "R" deviates to the right of the ideal position. One of the main causes of the deviation is "trajectory deviation", which has been described above. In FIG. 30, the deviation of the dot pitch is shown as a ratio. Ink dots whose deviation is above or below a predetermined threshold, for example ±10%, cause "banding".

Figure 31:
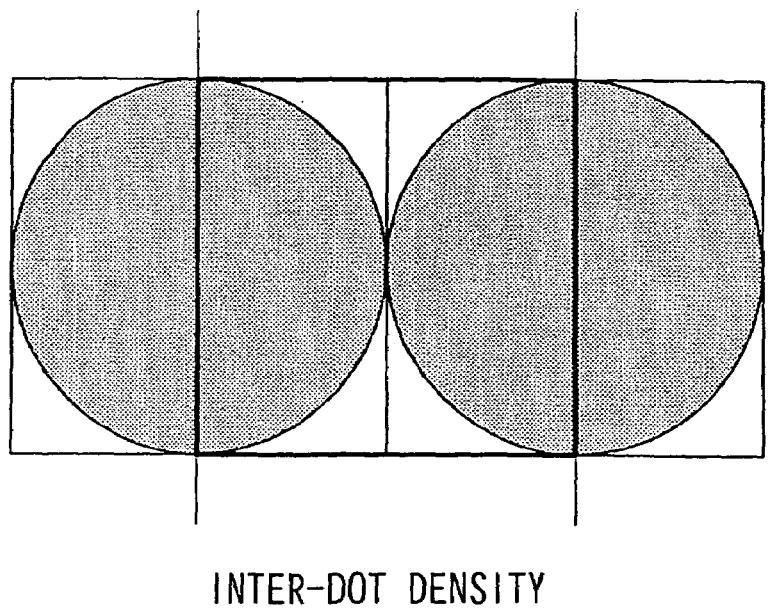
FIG. 31 shows a dot pattern for describing inter-dot density.
Figures 33, 34:
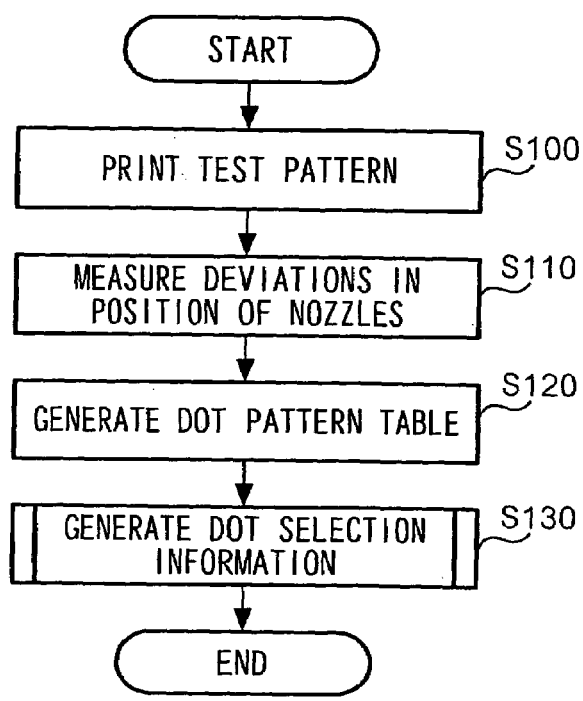
FIG. 33 shows a flow chart illustrating operations for generating dot selection information DS in accordance with the fourth embodiment.
FIG. 34 shows an example of the dot pattern table in accordance with the fourth embodiment.

In the present embodiment, dot selection information DS is generated by, for example, the operations shown in FIG. 33. Dot selection information DS includes information for selecting a dot size. The present embodiment can reduce banding. Each nozzle corresponds to a pixel of image data in print resolution. Some terms used in the descriptions of FIG. 33 are defined as follows: The size of an ink dot directly corresponds to a density in a predetermined unit area. Because both the size of an ink dot and a dot pitch between two adjacent ink dots are very small, a density of an image formed on a paper, which is sensed by the human sense of sight, depends on a density of ink dots. As shown in FIG. 31, "inter-dot density" is defined by a density in unit area. The unit area is defined by the ideal position of two adjacent ink dots.

Figure 32:
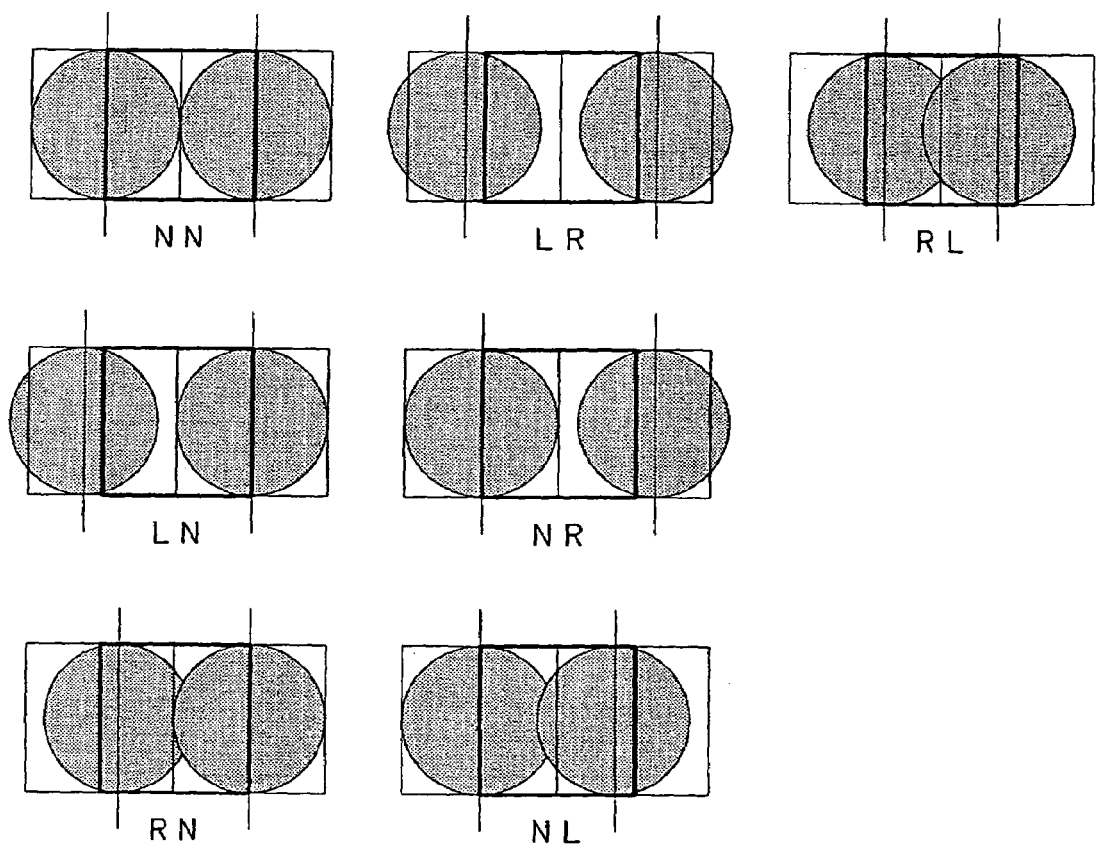
FIG. 32 shows classification of deviation in position of two adjacent ink dots.

FIG. 32 shows classification of deviation in position of two adjacent ink dots. "NN" denotes that both the ink dots are formed at the ideal positions. "LN" denotes that the left ink dot deviates to the left and the right ink dot is formed at the ideal position. "RN" denotes that the left ink dot deviates to the right and the right ink dot is formed at the ideal position. "NR" denotes that the left ink dot is formed at the ideal position and the right ink dot deviates to the right. "NL" denotes that the left ink dot is formed at the ideal position and the right ink dot deviates to the left. "LR" denotes that the left ink dot deviates to the left and the right ink dot deviates to the right. "RL" denotes that the left ink dot deviates to the right and the right ink dot deviates to the left. In the following descriptions, a term "dot pattern" means the positional relationship between two adjacent dots. In the present embodiment, dot selection information DS includes the dot patterns for the nozzles (pixels). Ink jet printer 2 stores dot selection information DS in memory 5 prior to the printing operation.

FIG. 33 shows a flow chart illustrating operations for generating dot selection information DS. First, personal computer 1 controls ink jet printer 2 to print a test pattern (in step S100). The test pattern is printed in accordance with the test pattern data stored in storage device 70. Next, deviations in position of ink dots actually formed on a paper are measured (in step S110). The deviations are measured by, for example, a microscope or a dot analyzing tool. A histogram of the deviations is shown in FIG. 30. Next, CPU 60 of personal computer 1 generates (in step S120) a dot pattern table on the basis of the measurement results of the deviations.

FIG. 34 shows an example of the dot pattern table. The dot pattern table includes a nozzle identifier and a corresponding dot pattern. In the dot pattern table, "L" denotes that the ink dot deviates to the left and "R" denotes that the ink dot deviates to the right. For example, in FIG. 34, dot pattern "LR" corresponds to nozzle identifiers "0" and "1". It shows the positional relationship between two nozzles identified by "0" and "1".

Referring to FIG. 33 again, CPU 60 generates (in step S130) dot selection information DS on the basis of the dot pattern table shown in FIG. 34, an inter-dot density table, and a dot generation table. The inter-dot density table and the dot generation table will be described in detail later.

Figure 35:
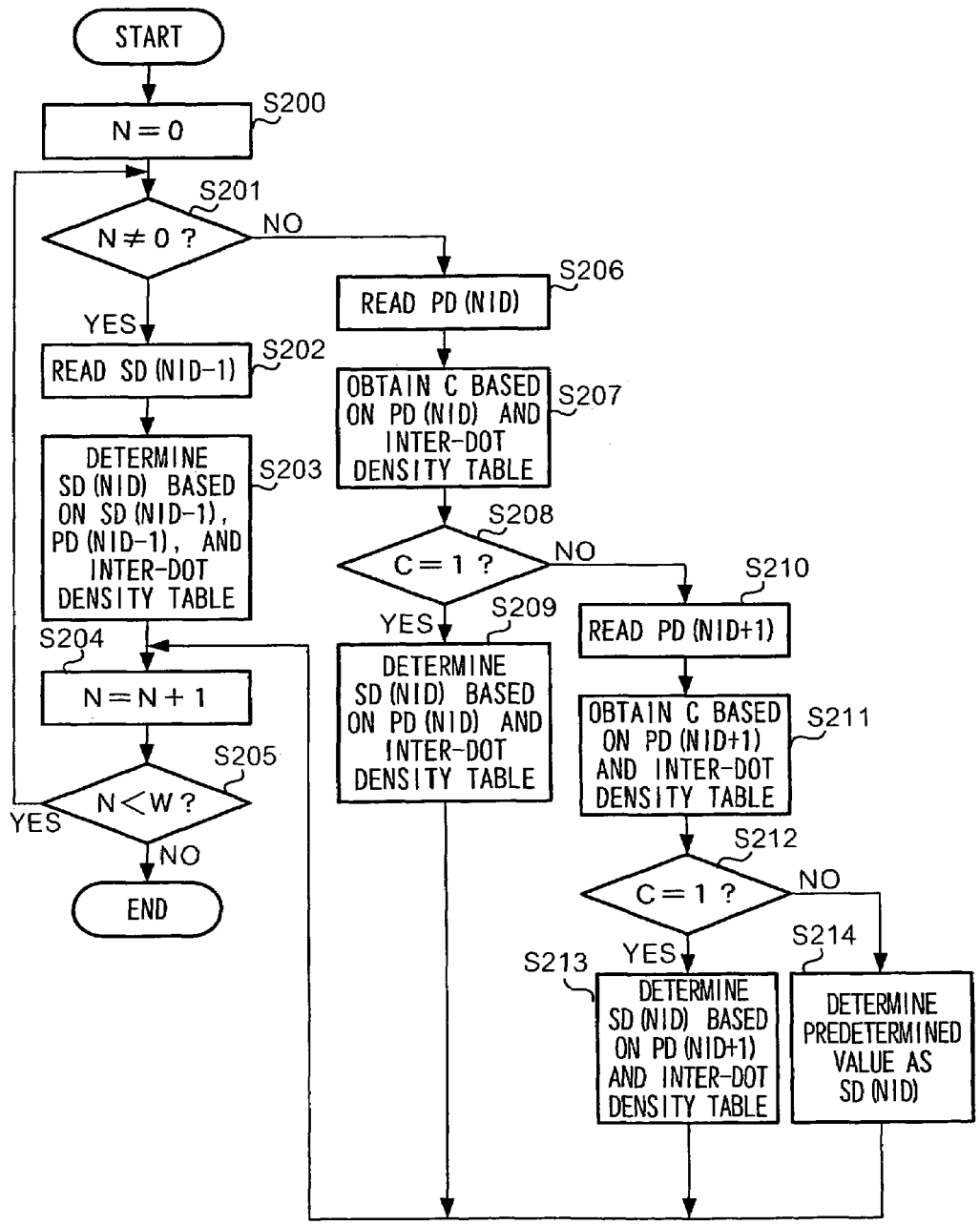
FIG. 35 shows a flow chart illustrating detailed operations for generating dot selection information DS in accordance with the fourth embodiment.

FIG. 35 shows a flow chart illustrating detailed operations for generating dot selection information DS in step S130. FIG. 36 shows an example of the inter-dot table. FIG. 37 shows an example of the dot generation table. In the following descriptions, "SD(NID)" denotes a dot size of an ink dot ejected by a nozzle having a nozzle identifier of "NID". Also, "PD(NID)" denotes a dot pattern corresponding to nozzles having nozzle identifiers of "NID" and "NID+1". Furthermore, in the present embodiment "L size ink dot", "M size ink dot", and "S size ink dot" refer to an ink dot a density of which is 96%, 80%, 64%, respectively. It is to be noted that the definitions of L, M, and S size in the present embodiment are different from those in the first and the second embodiment. In FIG. 37, shaded fields show a preferred dot size. The "preferred dot size" is a dot size that gives the nearest inter-dot density to the required density (80%), in a case that the dot size of the left ink dot is given. Furthermore, a dark shaded field shows an undesired dot size. Although the undesired dot size falls in the range of the above-defined preferred dot sizes, it is preferable to avoid selecting an undesired dot size as an instruction for causing ejection of an ink dot because the difference between the deep shaded density and the required density is large. It is preferable to avoid selecting a combination of dot sizes.

First, in step 200, CPU 60 initializes nozzle identifier NID as zero. The nozzle identifier shows a nozzle of interest, in other words, a nozzle that is an object of the operation. Next, in step S201, CPU 60 determines whether the nozzle of interest is located at the edge, in other words, CPU 60 determines whether nozzle identifier NID satisfies NID≠0. In a case of NID≠0 (in step S201: YES), CPU 60 proceeds the operation of step S202. In a case of NID=0 (in step S201: NO), CPU 60 proceeds to step S206.

In step S202, CPU 60 reads a value of SD(NID−1) from RAM 62. In addition, CPU 60 reads a value of PD(NID−1) from the dot pattern table shown in FIG. 34. Next, in step S203, CPU 60 determines SD(NID) on the basis of SD(NID−1), PD(NID−1), and the inter-dot density table shown in FIG. 36. SD(NID) is determined so as to minimize the difference between the inter-dot density and the required density. After determining SD(NID), CPU 60 stores determined SD(NID) in RAM 62. Next, in step S204, CPU 60 updates the nozzle identifier as NID=NID+1. Next, in step S205, CPU 60 determines whether the operations are completed for a line, in other words, CPU 60 determines whether NID satisfies NID<W. Here, W denotes a width of the print media. In a case of NID<W (in step S205: YES), in other words, in a case that the operations are not completed for a line, CPU 60 repeats the operations of steps S201-S204. In a case of NID≧W (in step S205: NO), in other words, in a case that the operations are completed for a line, CPU 60 terminates the operations for generating dot selection information.

In step S206, CPU 60 reads a value of PD(NID) from the dot pattern table shown in FIG. 34. Next, in step S207, CPU 60 obtains a number, C, on the basis of PD(NID) and the inter-dot density table shown in FIG. 36. Here, "C" denotes a number of combination of dot sizes for obtaining the nearest inter-dot density to the required density. Next, in step S208, CPU 60 determines whether C satisfies C=1. In a case of C=1 (in step S208: YES), CPU 60 determines (in step S209) a value of SD(NID) on the basis of PD(NID) and the inter-dot density table shown in FIG. 36. After determining SD(NID), CPU 60 proceeds to step S204.

In a case of C≠1 (in step S208: NO), CPU 60 proceeds to step S210. In step S210, CPU 60 reads a value of PD(NID+1) from the dot pattern table shown in FIG. 34. Next, in step S211, CPU 60 obtains a number of combination C, on the basis of PD(NID+1), and the inter-dot density table shown in FIG. 34. Next, in step S212, CPU 60 determines whether C satisfies C=1. In a case of C=1 (in step S212: YES), CPU 60 determines (in step S213) a value of SD(NID) on the basis of PD(NID+1) and the inter-dot density table shown in FIG. 36. After determining SD(NID), CPU 60 proceeds to step S204.

In a case of C≠1 (in step S212: NO), CPU 60 proceeds to step S214. In step S214, CPU 60 determines a predetermined value as a value of SD(NID). For example, SD(NID) is determined as SD(NID)=M size. After determining SD(NID), CPU 60 proceeds to the operation of step S204. It is to be noted that the operations of steps S210-S213 may be repeated in step S214.

Figure 38:
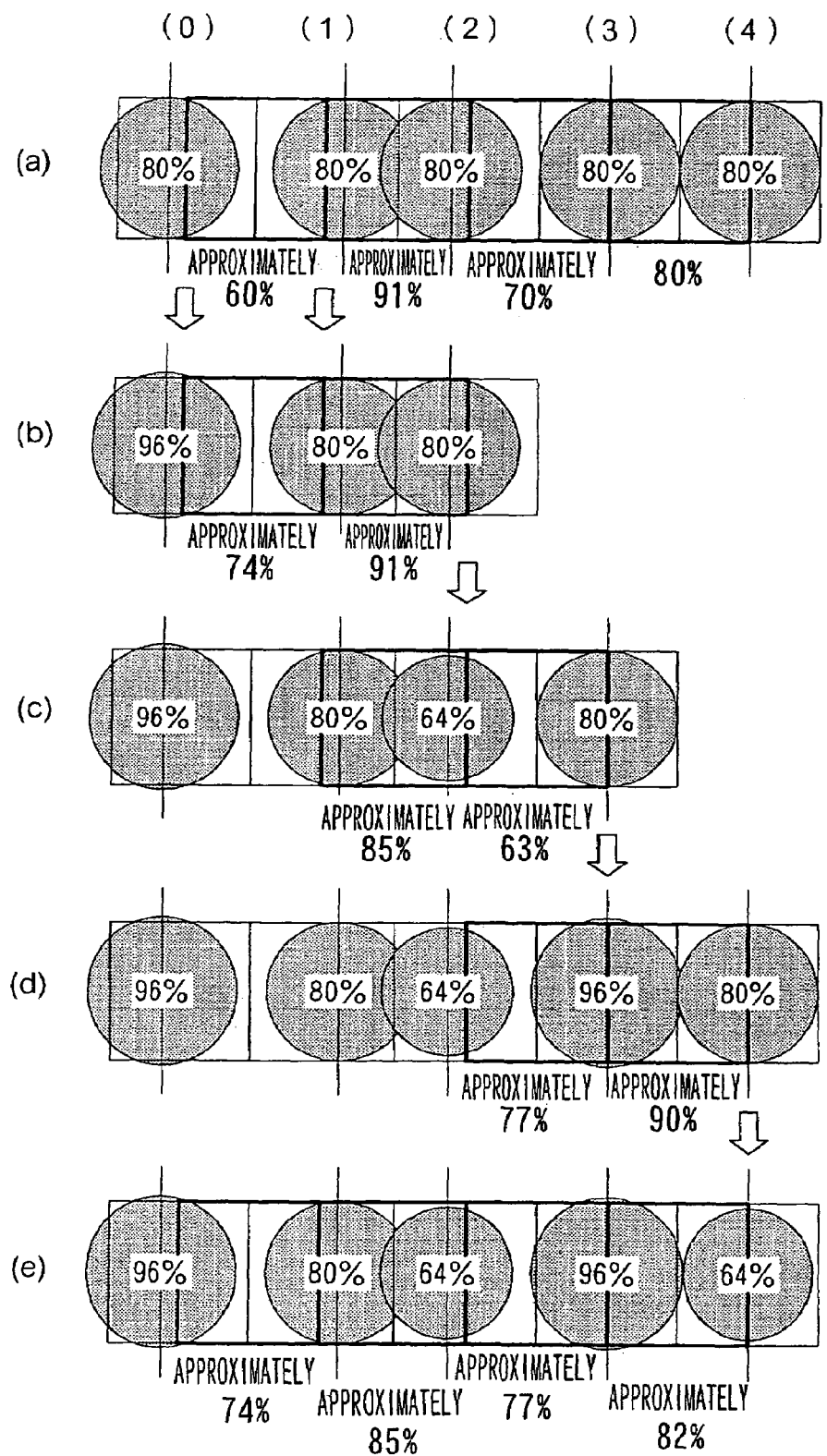
FIGS. 38A-38E show an example of the operations for determining a dot size.

FIGS. 38A-38E show an example of the operations for determining a dot size. FIGS. 38A-38E show an example under the following conditions as shown in FIG. 38A. (1) The required densities for nozzles of NID=0-4 are 80%. The nozzles correspond to the print resolution. An ink dot formed by a nozzle of NID=0 deviates to the left. An ink dot formed by a nozzle of NID=1 deviates to the right. An ink dot formed by each of nozzles of NID=3 and 4 is at the ideal position.

For example, nozzle identifier NID is initialized as NID=0 (in step S200 of FIG. 35). CPU 60 proceeds to step S206 in FIG. 35 because NID satisfies NID=0. In step S206, PD(0)=LR is obtained. In step S207, referring to the fields corresponding to a dot pattern of LR in the inter-dot density table shown in FIG. 36, two combinations "M-L" and "L-M" are obtained for candidates of a combination of dot sizes to obtain the nearest inter-dot density to the required density. In other words, C=2 is obtained. CPU 60 proceeds to step S210.

In step S210, PD(1)=RL is obtained from the dot pattern table shown in FIG. 34. In a case that a combination of dot sizes of two ink dots formed by nozzles of NID=0 and 1 is "M-L", a combination of dot sizes of two ink dots, formed by nozzles of NID=1 and 2, for obtaining the nearest inter-dot density to the required density, is "L-S". The inter-dot density of the two ink dots whose combination of dot sizes is "L-S" is 92.3% as shown in FIG. 36. On the contrary, in a case that a combination of dot sizes of two ink dots formed by nozzles of NID=0 and 1 is "L-M", a combination of dot sizes of two ink dots, formed by nozzles of NID=1 and 2, for obtaining the nearest inter-dot density to the required density is "M-S". The inter-dot density of the two ink dots whose combination of dot sizes is "M-S" is 85.3% as shown in FIG. 36. Therefore, a result is obtained that a combination of two nozzles of NID=1 and 2 giving the nearest inter-dot density to the required density is "M-S". In other words, C=1 is obtained. Therefore, a combination of two nozzles of NID=0 and 1 is determined as "L-M". Thus, CPU 60 determines that SD(NID)=L size as shown in FIG. 38B.

Next, the nozzle identifier is updated as NID=1 (in step S204 of FIG. 35). In this case, the operations are repeated because the operations are not completed for a line. CPU 60 proceeds to step S202 because of NID≠0. SD(0)=L size has been already determined by the previous operations. PD(0)=LR is obtained from the dot pattern table shown in FIG. 34. In a case of SD(0)=L size and PD(0)=LR, SD(1)=M size is determined to obtain the nearest inter-dot density to the required density, as shown in FIG. 38B.

Next, the nozzle identifier is updated as NID=2 (in step S204 of FIG. 35). In this case, the operations are repeated because the operations are not completed for a line. CPU 60 proceeds to step S202 because NID≠0. SD(1)=M size has been already determined by the previous operations. PD(1) =RL is obtained from the dot pattern table shown in FIG. 34. In a case of SD(1)=M size and PD(1)=RL, SD(2)=S size is determined to obtain the nearest inter-dot density to the required density, as shown in FIG. 38C.

Next, the nozzle identifier is updated as NID=3 (in step S204 of FIG. 35). In this case, the operations are repeated because the operations are not completed for a line. CPU 60 proceeds to step S202 because NID≠0. SD(2)=S size has been already determined by the previous operations. PD(2)= LN is obtained from the dot pattern table shown in FIG. 34. In a case of SD(2)=S size and PD(2)=LN, SD(3)=L size is determined to obtain the nearest inter-dot density to the required density, as shown in FIG. 38D.

Next, the nozzle identifier is updated as NID=4 (in step S204 of FIG. 35). In this case, the operations are repeated because the operations are not completed for a line. CPU 60 proceeds to step S202 because NID≠0. SD(3)=L size has been already determined by the previous operations. PD(3) =NN is obtained from the dot pattern table shown in FIG. 34. In a case of SD(3)=L size and PD(3)=NN, SD(4)=S size is determined to obtain the nearest inter-dot density to the required density, as shown in FIG. 38E.

Dot selection information DS is generated by repeating the above-described operation for all nozzles. By selecting a dot size using dot selection information DS, the print system of the present embodiment can obtain a printed image in which the deviation in density, caused by the deviation in position of an ink dot, is compensated. Thus, banding can be reduced.

In another embodiment, a dot size may be determined by operations in step S13 of FIG. 4 similar to the operations shown in FIG. 35, instead of using dot selection information DS.

Figures 39, 40, 43:
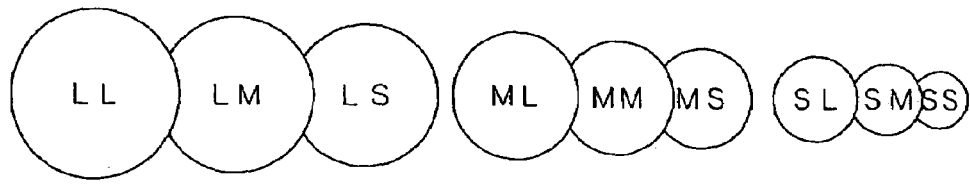
FIG. 39 shows a table storing relations between a nozzle identifier and a dot size in accordance with another embodiment.
FIG. 40 shows image data after the binarization in accordance with another embodiment.
FIG. 43 shows an example of dot sizes in accordance with 4-level quantization.
Figures 41, 42:
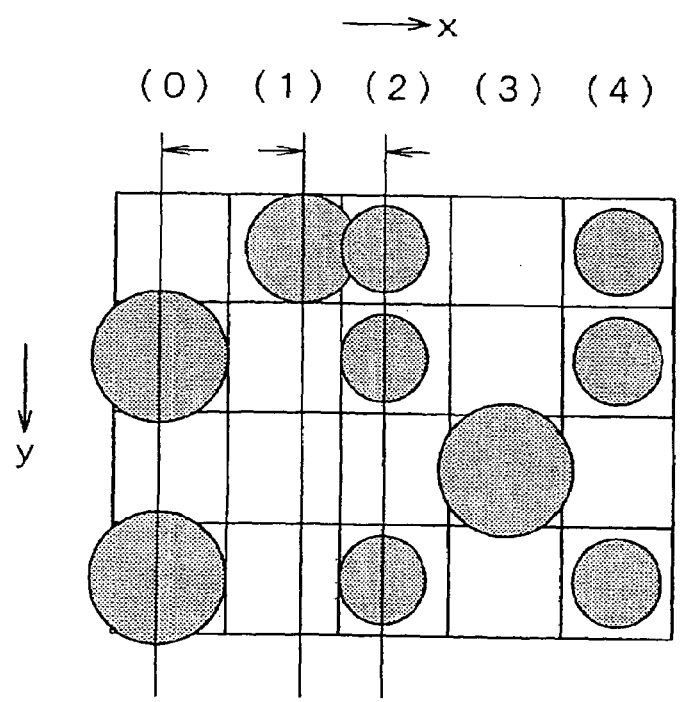
FIG. 41 shows image data after the dot selection in accordance with another embodiment.
FIG. 42 shows an example of an image (ink dots) formed in accordance with the dot size selection of the fourth embodiment.

FIG. 39 shows a table storing relations between a nozzle identifier and a dot size, in accordance with another embodiment. FIG. 40 shows image data after the binarization. For example, regarding a nozzle of NID=0, the image data shows that ink dots are to be formed at locations (0, 1) and (0, 3). In this case, as shown in FIG. 41, L size is selected as an instruction for causing ejection of an ink dot on the basis of the table shown in FIG. 39. Regarding a nozzle of NID=1, the image data shows that an ink dot is to be formed at location (1, 0). In this case, as shown in FIG. 41, M size is selected as an instruction for causing ejection of an ink dot on the basis of the table shown in FIG. 39. Regarding a nozzle of NID=2, the image data shows that ink dots are to be formed at locations (2, 0), (2, 1), and (2, 3). In this case, as shown in FIG. 41, S size is selected as an instruction for causing ejection of an ink dot on the basis of the table shown in FIG. 39. Regarding a nozzle of NID=3, the image data shows that an ink dot is to be formed at location (3, 2). In this case, as shown in FIG. 41, L size is selected as an instruction for causing ejection of an ink dot on the basis of the table shown in FIG. 39. Regarding a nozzle of NID=4, the image data shows that ink dots are to be formed at locations (4, 0), (4, 1), and (4, 3). In this case, as shown in FIG. 41, S size is selected as an instruction for causing ejection of an ink dot on the basis of the table shown in FIG. 39.

FIG. 42 shows an example of an image (ink dots) formed in accordance with the dot size selection of the present embodiment. The deviations in portions of the ink dots are compensated by selecting appropriate sizes of ink dots. Thus, banding can be reduced in accordance with the present embodiment. As described above, the present embodiment provides a print system having a plurality of nozzles, each of which can eject a plurality of sizes of ink dot. The size of an ink dot is determined so as to obtain a density nearly equal to the required density. The size of the ink dot is determined in response to the relationship between two ink dots. One ink dot is formed by a first nozzle and the other ink dot is formed by another nozzle located near the first nozzle. The present embodiment provides a line head printer capable of forming an image in which banding is reduced in an effective manner.

In addition, the instructions for ejecting an ink dot are generated on the basis of the measurement results of the positional relationship between an ink dot and an ink dot adjacent thereto. For example, in a case that a dot pitch between two ink dots is greater than the ideal dot pitch, a larger dot size is selected as an instruction for causing ejection of an ink dot. In a case that a dot pitch between two ink dots is less than the ideal dot pitch, a smaller dot size is selected as an instruction for causing ejection of an ink dot. The present embodiment provides a line head printer capable of forming an image in which banding is reduced in an effective manner and a density of which is approximately equal to the required density.

In addition, information for selecting a dot size is stored in the print system prior to the printing operation. The information includes an instruction for causing ejection of an ink dot that is in conformity with the positional relationship between two ink dots. The positional relationship is obtained by measurement of ink dots actually formed on a print medium. Thus, the calculation load for determining the dot size is reduced. The print system can operate at low cost.

5. Fifth Embodiment

The fifth embodiment of the invention will be described in this section. Image processing for compensating for deviations in dot size (dot radius) is described in the first through the third embodiments. In addition, image processing for compensating for deviations in position of ink dots is described in the fourth embodiment. The present embodiment provides image processing for compensating both deviations in dot size and deviations in position.

The print system of the present embodiment is basically the same as that of the first embodiment shown in FIG. 1. In the following descriptions, elements common to the first embodiment will be denoted by the same reference numerals. In the present embodiment, each nozzle can eject an ink dot having a dot size shown in FIG. 28. In other words, the nozzle can eject three radii of ink dots, which correspond to densities of 96%, 80%, and 64%. These dot sizes are referred to as L, M, and S size in the present embodiment. It is to be noted that the L, M, and S sizes in the present embodiment are different from those in the first embodiment. The operations of device driver 3 are basically the same as those described in the first embodiment, as shown in steps S1-S5 of FIG. 1 and steps S11-S17 of FIG. 4. However, the operations of dot size determination in step S13 are different from those in the first embodiment.

In the present embodiment, a pixel value of image data is converted into four level values, L size ink dot, M size ink dot, S size ink dot, and no ink dot. Accurately, the operation in step S3 of FIG. 1 is "4-level quantization" but it is described as "binarization" for convenience. In the present embodiment, the nozzles of ink jet printer 2 can eject seven radii of ink dots. In other words, the nozzles can output 8-level of gradations, including no ink dot, as well as the seven radii of ink dots. Therefore, the dot size selection in step S13 shown in FIG. 4 is different from that of the first embodiment.

FIG. 44 shows an example including both deviations in dot size and deviations in position. The upper ink dots are the ideal ink dots, each of which has an ideal dot size and is formed at ideal position. The lower ink dots are the actual ink dots having both deviations in dot size and deviations in position. In view of the deviation in dot size, each area of two left ink dots, corresponding to nozzles of NID=0 and 1, are 20% larger than that of the ideal ink dot. The area of the center ink dot, corresponding to a nozzle of NID=2, is equal to that of the ideal ink dot. Each area of two right ink dots, corresponding to nozzles of NID=3 or 4, are 20% smaller than that of the ideal ink dot. Furthermore, in view of the deviation in position, the positions of the ink dots corresponding to nozzles of NID=0 and 2 deviate to the left. The position of the ink dot corresponding to the nozzle of NID=1 deviates to the right. The positions of the ink dots corresponding to the nozzles of NID=3 or 4 are the ideal positions.

FIG. 45 shows an example of dot selection information DS in accordance with the present embodiment. Dot selection information DS includes a table that correspondingly stores a nozzle identifier, a dot size including information for compensating for a deviation in dot size and a dot pattern including information for compensating for a deviation in position of an actual ink dot. The meanings of the dot patterns are the same as those described in the fourth embodiment as shown in FIG. 32. The dot selection information may be generated by a combination of methods of the first embodiment and the fourth embodiment. For example, the deviations in dot size and deviations in position are measured for each nozzle by a predetermined test pattern. Thus, information for compensating for a deviation in dot size and information for compensating for a deviation in position are combined with each nozzle identifier.

Alternatively, the dot selection information may be generated on the basis of a density in a unit area. The density depends on both the deviation in dot size and the deviation in position. The density may be measured by a scanner or a color measurement device. In this case, the dot selection information can be generated in a similar manner to that described in the fourth embodiment.

Next, descriptions will be given for dot size determination. Generally, the dot size determination is performed as follows. First, CPU 60 performs, for binary image data obtained by binarization in step S3 of FIG. 1, dot size selection for compensating for deviations in dot size, as described in the first embodiment. Thus, CPU 60 determines temporary instructions. Then, CPU 60 performs, in accordance with the temporary instructions, dot size selection for compensating for the deviations in position described in the fourth embodiment. Thus, CPU 60 determines final instructions.

FIG. 46 shows an example schematically illustrating ink dots after the dot size selection for compensating for the deviation in dot size. The ink dots shown in FIG. 46 are not actually formed, but show temporary status of instructions for causing ejection of ink dots. As shown in FIG. 46, the dot size of each ink dot is equal to M size, the ideal dot size. Ink dots shown in FIG. 46 are the same as those of the fourth embodiment, shown in FIG. 38A. Therefore, by performing dot selection as described in the fourth embodiment, the print system can obtain a print result as shown in FIG. 38E.

Descriptions of the details of the dot selection for compensating for the deviation in dot size and dot selection for compensating the deviation in position are omitted in this section because the operations are the same as those described in the first embodiment and the fourth embodiment.

Although a combination of the dot selections of the first and the fourth embodiments is employed in the present embodiment, another combination may be employed. For example, a combination of the dot selections of the second and the fourth embodiments or a combination of the dot selections of the third and the fourth embodiments may be employed as dot selections for compensating for both the deviation in dot size and the deviation in position.

6. Further Embodiments

The invention is not restricted to the above described embodiments, and various modifications can be applied to the embodiments.

Personal computer 1 may obtain dot selection information DS from devices other than ink jet printer 2. For example, personal computer 1 may have a database storing dot selection information DS. In this case, personal computer 1 may obtain dot selection information DS from the database. Alternatively, the print system may have a server device connected to personal computer 1 via network. The server device may store in a storage device information on a plurality of dot selections DS, each of which is associated with a printer ID. In this case, personal computer 1 may transmit a request for transmitting dot selection information DS and its own ID to the server device. The server device may transmit to personal computer 1 dot selection information DS corresponding to the received ID.

In addition, the number of dot sizes that the nozzles of ink jet printer 2 is capable of ejecting is not restricted to the descriptions in the embodiments. For example, in a case that the deviation of dot size is small, the number of dot sizes may be decreased. In a case that the deviation of dot size is large, the number of dot sizes may be increased. Thus, the number of dot sizes may be determined in response to the quality of the nozzle and the required print quality.

In addition, in a case that two (or more) dot sizes are selected as candidates of an instruction for causing ejection of an ink dot, the instruction may be determined, for example, as follows. One of the candidates may be determined as the instruction in a ratio of $\alpha(0 \leq \alpha \leq 1)$, and the other candidate may be determined as the instruction in a ratio of $(1-\alpha)$.

In addition, in the fourth embodiment, an optimization to make the density of the actual ink dots closer to the required density may be employed. In a case that dot patterns are RL, LR, and RL from the left nozzle to the right nozzle, dot sizes are determined as S, S, L, and S in accordance with the fourth embodiment. In other words, inter-dot densities are 78.8%, 67.4%, and 92.3% for a required density of 80%. In this case, by changing a dot size of an ink dot of NID=1 into M size, inter-dot densities become 85.3%, 74.4%, and 92.3%, thereby becoming closer to the required density. As a further example, in a case that dot patterns are LR and RN, the dot sizes are determined as S, L, and S. In other words, inter-dot densities are 67.3% and 89.7%. In this case, by changing dot sizes of ink dots of NID=0 and 3 into M size, inter-dot densities become 60% and 74.4%, thereby becoming closer to the required density.

In addition, the quantization is not restricted to binarization (in other words, 2-level quantization). FIG. 43 shows an example of dot sizes in accordance with 4-level quantization. In this case, the ideal dot sizes are LM, MM, and SM size, as well as no ink dot (zero size). LM, MM, and SM size correspond to densities of 120%, 80%, and 40%, respectively. The nozzles can eject an ink dot whose dot size (dot radius) is LL, LM., LS, ML, MM, MS, SL, SM, or SS size. LL, ML, and SL sizes are larger than LM, MM, and SM sizes, respectively. LS, MS, and SS sizes are, for example smaller than LM, MM, and SM sizes, respectively. Although a table similar to the table shown in FIG. 39 is necessary for each ideal dot size, the print system can determine dot sizes by performing operations shown in FIG. 33.

Although the descriptions are given for examples with a line head printer, the invention may be applied to another type of printer, for example, a multi-pass printer.

In the above described embodiments, personal computer 1 performs operations of steps S1-S5 in FIG. 1. However, all or a part of these operations may be performed by ink jet printer 2.

What is claimed is:

1. An image processing device, comprising:
    an N-level quantization unit, where N is a natural number equal to or greater than 2, the unit converting multi-level image data into N-level image data, the multi-level image data including a plurality of pixels, each pixel having a value corresponding to one of a multi-level gradation, and the N-level image data including a size of an ideal ink dot to be formed;
    a memory that stores error information, the error information corresponding to a difference between an ideal ink dot and an actual ink dot, the actual ink dot being formed by an image forming device, the image forming device having a plurality of nozzles, and each of the plurality of nozzles being associated with an ideal ink dot and an actual ink dot, and being capable of ejecting M-number of ink dot sizes, where M is a natural number equal to or greater than 2 and satisfies M≧N;
    an error information obtaining unit that obtains from the memory error information corresponding to an identified one of the plurality of nozzles, the identified nozzle being used for image processing;
    a dot size determining unit that determines a size of an ink dot on the basis of the error information, the ink dot being ejected by the identified nozzle, and a size of the ink dot being determined such that a density of the ejected ink dot is approximately equal to a required density, the required density being determined by the N-level image data; and
    an output unit that outputs to the image forming device an instruction for causing ejection of an ink dot from the identified nozzle, the size of the ejected ink dot being determined by the dot size determining unit.

2. An image processing device according to claim 1, wherein the error information includes size information, the size information corresponding to a difference between a size of the actual ink dot and a size of the ideal ink dot.

3. An image processing device according to claim 2, wherein the size information includes an instruction for causing ejection of an ink dot, the instruction corresponding to a size of the ink dot to be ejected.

4. An image processing device according to claim 3, wherein the memory further stores an instruction table, the instruction table storing a pixel value of N-level image data, a nozzle identifier for identifying a nozzle, and an instruction for causing ejection of an ink dot.

5. An image processing device according to claim 4, wherein:
    a pixel value of N-level image data corresponds to two or more candidates for an instruction for causing ejection of an ink dot at least in a part of the instruction table; and
    the dot size determining unit determines an instruction from the two or more candidates alternately, in turn, or at random.

6. An image processing device according to claim 1, wherein the error information includes positional information, the positional information corresponding to a difference between a position at which the actual ink dot is formed and a position of the ideal ink dot.

7. An image processing device according to claim 6, wherein:
    the memory further stores an inter-dot density table, the inter-dot density table correspondingly storing positional information of two ink dots formed by two adjacent nozzles, a combination of dot sizes of the two ink dots, and an inter-dot density of the two ink dots, the inter-dot density being a density of ink dots in unit area; and
    the dot size determining unit determines a dot size on the basis of a combination of the two ink dots corresponding to the nearest inter-dot density to the required density from the inter-dot table.

8. An image processing device according to claim 6, wherein:
    the error information includes both size information and positional information, the size information corresponding to a difference between a dot size of the actual ink dot and a dot size of the ideal ink dot, the positional information corresponding to a difference between a position at which the actual ink dot is formed and a position of the ideal ink dot; and
    the dot size determining unit determines a dot size on the basis of both the size information and the positional information.

9. An image processing device according to claim 1, wherein the error information includes density information, the density information corresponding to a difference between a density of an actual ink dot in unit area and a density of an ideal dot in unit area.

10. An image processing method, comprising:
    converting multi-level image data into N-level image data, where N is a natural number equal to or greater than 2, the multi-level image data including a plurality of pixels, each pixel having a value corresponding to one of a multi-level gradation, and the N-level image data including a size of an ideal ink dot to be formed;
    obtaining from a memory, error information corresponding to a difference between an ideal ink dot and an actual ink dot relative to one of a plurality of nozzles of an image forming device, each nozzle being capable of ejecting M-number of ink dot sizes, where M is a natural number equal to or greater than 2 and satisfies M≧N, and the identified one of the plurality of nozzles being used for performing an image processing operation;
    determining a dot size of an ink dot on the basis of the error information, the ink dot being ejected by the identified nozzle, the dot size being determined so as to make a density of the ink dot approximately equal to a required density, the required density being determined by the N-level image data; and outputting to the image forming device an instruction for causing ejection of an ink dot from the identified nozzle.

11. A computer program, causing a computer to execute:

converting multi-level image data into N-level image data, where N is a natural number equal to or greater than 2, the multi-level image data including a plurality of pixels, each pixel having a value corresponding to one of a multi-level gradation, and the N-level image data including a size of an ideal ink dot to be formed;

obtaining from a memory, error information corresponding to a difference between an ideal ink dot and an actual ink dot relative to one of a plurality of nozzles of an image forming device, each nozzle being capable of ejecting M-number of ink dot sizes, where M is a natural number equal to or greater than 2 and satisfies M≧N, and the identified one of the plurality of nozzles being used for performing an image processing operation;

determining a dot size of an ink dot on the basis of the error information, the ink dot being ejected by the identified nozzle, the dot size being determined so as to make a density of the ink dot approximately equal to a required density, the required density being determined by the N-level image data; and outputting to the image forming device an instruction for causing ejection of an ink dot from the identified nozzle.

* * * * *